United States Patent [19]
Converse, III et al.

[11] 3,938,377
[45] Feb. 17, 1976

[54] METHOD AND APPARATUS FOR PRODUCTION HOT TESTING OF ENGINES UNDER LOAD

[75] Inventors: Vernon G. Converse, III, Franklin, Mich.; Edwin L. Cline, Pasadena; Leland P. Tinkham, Desert Hot Springs, both of Calif.

[73] Assignees: Scans Associates, Inc., Livonia, Mich.; Clayton Manufacturing Co., El Monte, Calif. ; part interest to each

[22] Filed: Jan. 7, 1974

[21] Appl. No.: 431,299

[52] U.S. Cl. ............ 73/117; 73/117.3; 73/134
[51] Int. Cl.² ................................ G01L 5/13
[58] Field of Search ......... 73/117.3, 134, 117, 118, 73/116

[56] References Cited
UNITED STATES PATENTS

| | | | |
|---|---|---|---|
| 2,220,007 | 10/1940 | Winther et al. | 73/134 |
| 2,870,875 | 1/1959 | Cline | 73/117 X |
| 3,439,534 | 4/1969 | Pilgrim | 73/117 |
| 3,527,087 | 9/1970 | Converse et al. | 73/117.3 |

OTHER PUBLICATIONS

Judge, A. W. The Testing of High Speed Internal Combustion Engines, 1955, p. 172, 4th Ed. revised Chapman & Hall Ltd., London.

Francois, G. W. et al. Small On–line Computer Controls Emission Test, from Automotive Engineering, Vol. 80, No. 6, June 72, p. 42.

Primary Examiner—Jerry W. Myracle
Attorney, Agent, or Firm—D. Edward Dolgorukov

[57] ABSTRACT

A method and apparatus for hot testing on a production basis, automobile engines as they come off the assembly line for performing a final check on such engines before they are installed in the automobile. The engines are tested for exhaust emissions at three points or KEY MODES of operation at which emission related engine malfunctions are most likely to appear. These points of operation are high cruise, low cruise, and idle. The engine, after it comes off the assembly line is placed in a production test stand wherein the connections for water, oil and exhaust are made, the engine is started, accelarated to the high cruise speed, and allowed to warm up for a predetermined time, after which time, measurements of hydrocarbons and carbon monoxide are taken and an appropriate indicator light lit to indicate that the engine either is within limits at this speed, or does not pass for some reason. The same procedure is followed in the low cruise and idle speeds. If one or more of the indicator lights show a reject condition, the engine is automatically removed from the production test stand and routed to a repair shop for further testing.

42 Claims, 23 Drawing Figures

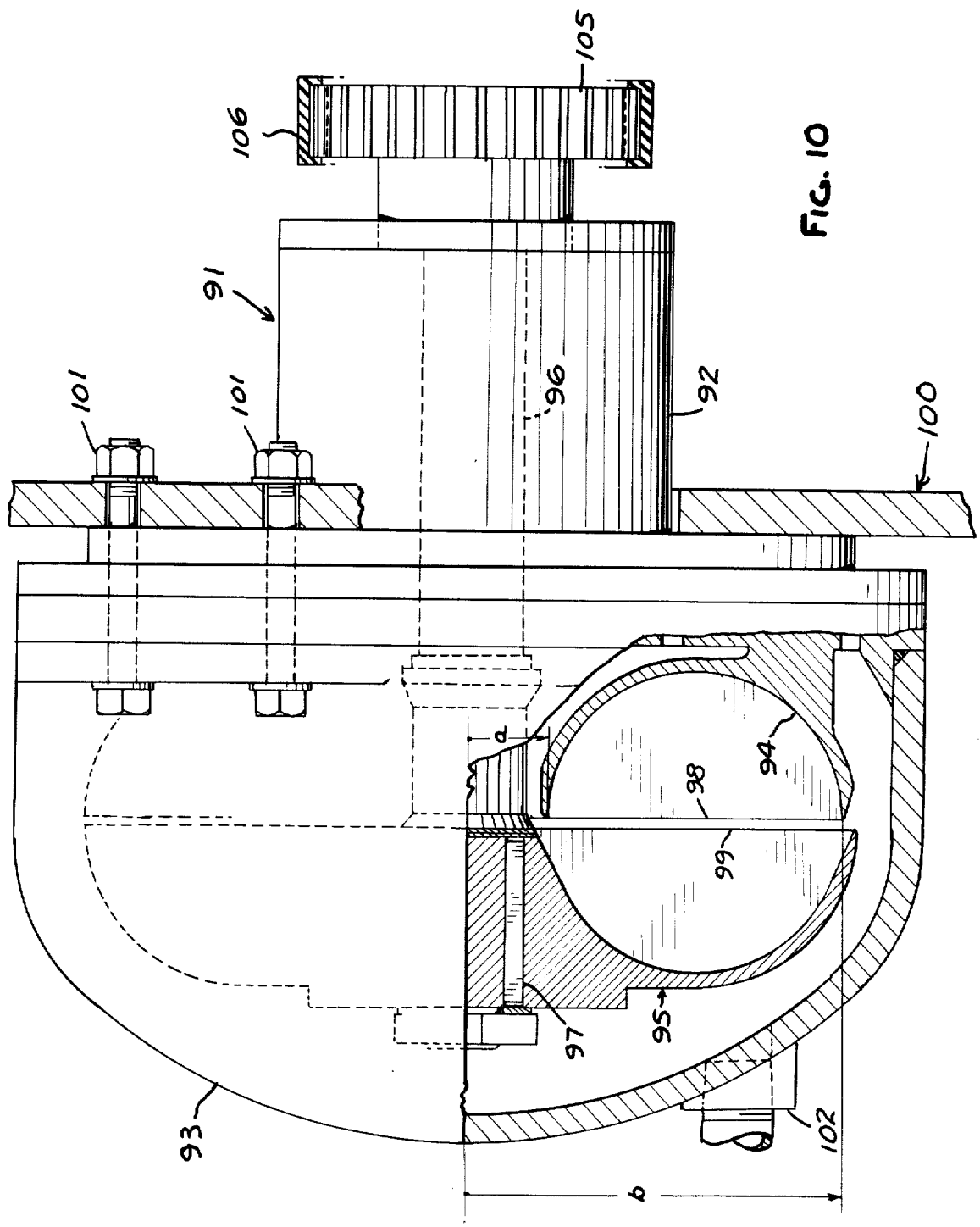

METHOD AND APPARATUS FOR PRODUCTION HOT TESTING OF ENGINES UNDER LOAD

This application, although an original application filed in the names of Vermon G. Converse III, Edwin L. Cline, and Leland P. Tinkham, contains common subject matter with an earlier filed Pat. application Ser. No. 306,815 for Method and Apparatus for Quickly Evaluating Engine Exhaust Gas Emissions. Portions of said earlier application are repeated herein for the purpose of providing a complete understanding of the present invention, and the entire specification of said application is incorporated herein by reference. The present invention relates to a method and apparatus for making quick final checks on a production line basis of the fully assembled automobile engine prior to its installation in the automobile to insure that all of the main systems of the automobile engine are functioning properly together, even though they may have been previously individually tested prior to the completion of the automobile engine.

Prior to the present day concern with the air pollution caused by exhaust gas emissions from major vehicles which do not function properly, there was no felt need for a final check of green engines under load as they came off the assembly line to insure that everything was functioning properly because there was no meaningful test which could be performed quickly to indicate engine malfunctions.

While individual checking of the main systems of the engine, such as carburetion, ignition and combustion, is absolutely necessary during the assembly of the engine to make sure that the assembly process is going correctly, it has been found that even though such individual tests are passed, the engine, when installed in a motor vehicle, can still fail Federal Emission Tests. In addition, it has been found that individual checking of the systems of the engine cannot detect all the possible malfunctions of the engine which testing after the engine is fully assembled and running under load can. For example, an exhaust valve leak which cannot be conveniently detected previous to the time the engine is finally assembled and can be tested running under load, can result in hydrocarbon emissions under certain conditions which are four times greater than normal, and similar examples can be found in the carburation and ignition system of the engine. For example, even though the ignition system may have been timed properly somewhere previous to final assembly, if a wire should come loose or some such occurence happen further down the production line, just one cylinder out of eight missing even one-half the time will cause hydrocarbon emissions to be nearly four times greater than normal.

Such malfunctions, which can only be found by hot testing the engine under load after assembly, are enough to make the engine fail the emission standards, which have been set for the engine after it is installed in the vehicle.

Therefore, it became essential to develop a method and apparatus to perform a final test of engine performance on a production line basis before the engine is installed in the motor vehicle. It has been found, as disclosed in the previously mentioned pending application, that exhaust gas emissions, and particularly CO and HC emissions, are the most perceptive indicators of engine malfunctions, and when data on those emissions is properly evaluated, such data can indicate what is wrong with the engine, and how to go about correcting it in an efficient manner, which is essential to any production test of the engine.

It has also been found that running the engine under the load which the particular engine would likely encounter if installed in a vehicle causes any engine malfunctions which are likely to occur to be seen, whereas running the engine with no load does not stress the engine and cause such defects to occur, so that a great many engine malfunctions are liable to remain hidden unless the test is made under load. In addition, certain speeds of the engine are more likely to cause engine malfunctions to occur than others.

Three key testing points, or KEY MODES of operation have been found to make engine malfunctions most likely to occur. Accordingly, the first KEY MODE requires operation of the engine at a RPM simulating "high cruise," at which time the main carburetor and ignition systems of the engine are in full operation.

KEY MODE 2 requires operation of the engine at "low cruise," which is in the transition area between idle speed and that point at which the main systems of the carburetion and ignition come into full operation.

KEY MODE 3 requires testing the engine at its idle speed, when the engine is operating with the carburetor throttle in normally closed position. these tests, of course, are made at the KEY MODE only after the engine has thoroughly warmed up, so that such factors as a malfunction in the automatic choke, etc. will enter into the test.

In accordance with the idea of producing a fast production test at the end of the assembly line, the values of CO and HC are measured at all test modes, compared with predetermined design values supplied by the engine manufacturer for the particular engine involved, and appropriate indicator lights indicate whether the engine has passed or failed the test for CO and HC at each KEY MODE of operation.

If the indicator lights show that the engine has passed the test for HC and CO emissions at all points of its operation, the engine is automatically removed from the test stand, which is preferably combined with the Accumulator Conveyor System shown in U.S. Pat. No. 3,631,967 to Vernon G. Converse III et al, and is passed for installation in the automobile. If one or more of the indicator lights shows that the engine has failed one of the tests, rather than occupying one of the test stations on the conveyor loop for the relatively great length of time necessary to provide for more detailed diagnostic tests of the engine to find the malfunction, a repair loop or off line test station is added to the system and contains a few test stands containing more sophisticated equipment. The engine is routed to one of these test stands, at which time more extensive testing is undertaken to find the exact engine malfunction.

Accordingly, one of the objects of the present invention is to provide a method and apparatus to perform a final hot test check of the automobile engine at the end of its assembly line before it is installed in the automobile.

Another object of the present invention is to perform a final hot test check of the automobile engine at the end of the assembly line by testing its exhaust gas emissions, whereby an engine can be passed or rejected in accordance with predetermined exhaust emission levels.

Another object of the present invention is to provide a method and apparatus for hot testing engines under load which is reliable, accurate and fast.

A further object is to provide a simple method and apparatus for performing final engine checking before installation by applying a series of predetermined loads to the engine at predetermined key speeds, at which emission related malfunctions are most likely to occur.

A further object of the present invention is to provide an apparatus as stated above for performing a final hot test of an automobile engine which will provide test results which are relatable to the emission levels to be expected after the engine is installed in a motor vehicle.

A still further object of the invention is to use the results of the analysis of the exhaust gas emissions of the internal combustion engine to aid in determining what, if anything, may be wrong with said engine, and to determine the steps needed to correct the defect.

A further object of the invention is to make the final hot test check of the engine as stated above in a manner which is simple and that can be carried out by persons having a minimum of test training and experience.

A further object of the present invention is to provide a loading device for the engine which maintains a load curve proportional to the cube of the engine speed without a load regulating system.

A still further object is to provide a method and apparatus to perform a final check of engine operation by subjecting said engine to predetermined key speeds and loads related to the conditions which the engine may encounter after installation in the vehicle, and at speeds simulating high cruise, low cruise and idle, and measuring the CO and HC values in the exhaust gas at each mode of operation.

A further object is to provide simple indicator lights at the production test stand performing such test to quickly and easily indicate to the operator whether the engine being tested has passed or failed the HC and CO tests at each key point (KEY MODE) of operation.

A still further object of the present invention is to provide a reporting system on which the indicator light signals may be recorded to indicate which test the engine has failed, and to further provide a "truth chart" having suggested malfunctions and remedies therefor that will enhance ready identification of the malfunctions.

A still further object of the present invention is to provide automated test stands in which the hot test of the engine may be performed and to provide these test stands around an automated endless conveyor for fast production testing of the engines.

Another object of the present invention is to provide a separate repair system for the production testing system mentioned above, into which any engine which fails the final hot test can be automatically routed for further detailed testing.

Still another object is to provide that the aforementioned truth charts and report cards be made so that they may accompany the rejected engine or be transmitted to the repair loop.

Further objects and advantages of this invention will be apparent from the following description and appended claims, reference being had to the accompanying drawings forming a part of this specification, wherein like reference characters designate corresponding parts in the several views.

FIG. 1 is a perspective view of an embodiment of the present invention whereby automated test stands for performing the final hot test of the engine under load prior to installation are arranged around an endless conveyor to form a completely automated testing system, said endless conveyor having a repair loop to which the rejected engines are sent for further testing, and having a station (not shown) whereby new engines are added to the testing system, and engines which have been passed, or passed after repair, are removed from the testing system and are sent for installation in the motor vehicle.

FIG. 10 is a partially cut-away elevational view of a fixed-fill power absorption unit as may be used to perform the loading of the engine in the present invention.

Figure 23:
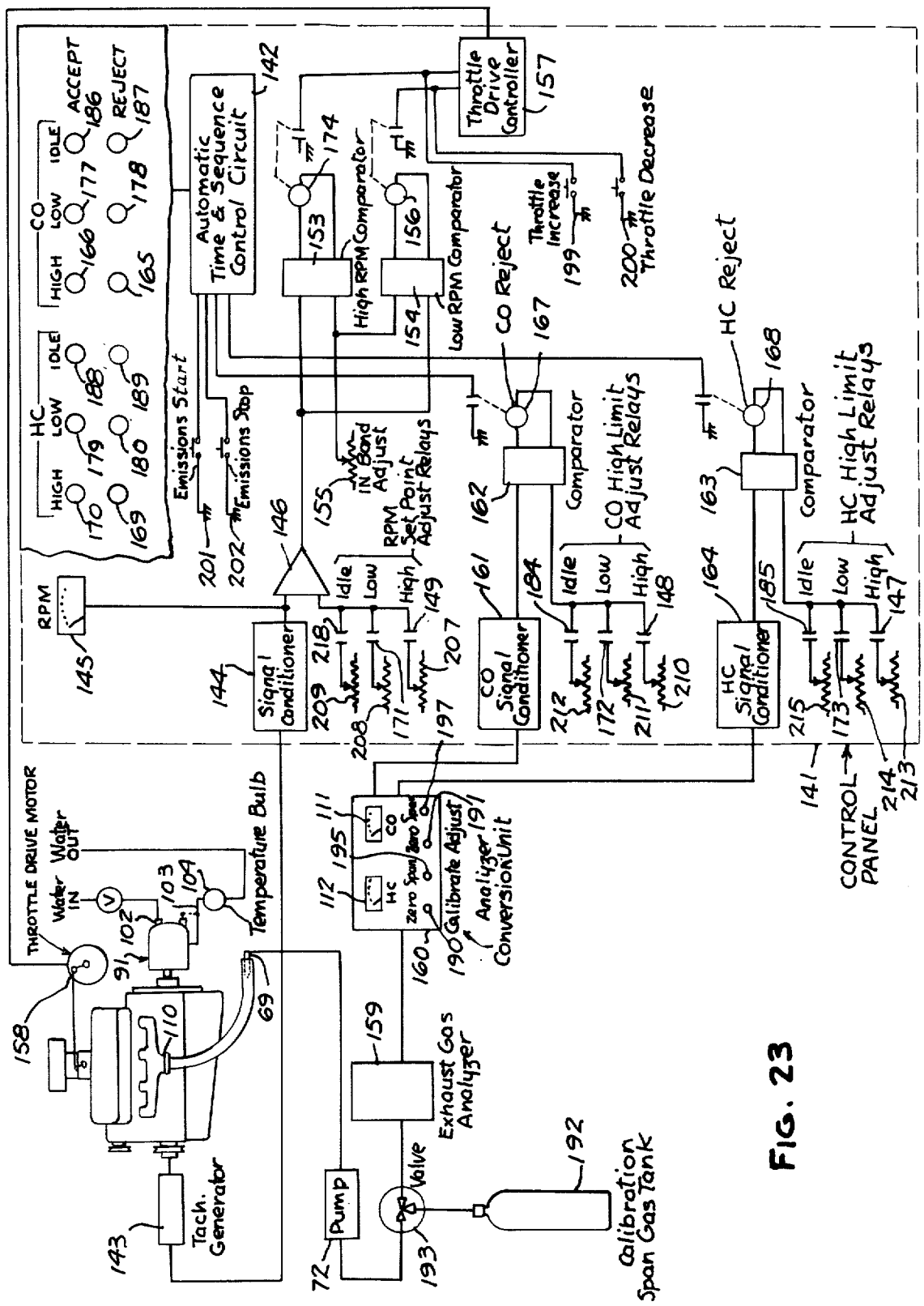

FIG. 23 is a diagrammatic view of the complete system of the present invention, including the apparatus necessary to run the engine, apply the proper load to the engine, sample the exhaust gas of the engine at the high cruise, low cruise and idle operation, analyze the exhaust gases at each point of operation for their HC and CO content, compare the HC and CO content of the exhaust gases at each point of operation with predetermined permissable limits, and indicate whether the engine has passed or failed the HC and CO tests at each test point.

It is to be understood that the invention is not limited in its application to the details of construction and arrangement of parts illustrated in the accompanying drawings, since the invention is capable of other embodiments of being practiced or carried out in various ways within the scope of the claims. Also, it is to be understood that the phraseology and terminology employed herein is for the purpose of description and not of limitation.

Work directed to finding a quick and simple method of performing a final check of an engine before it was installed in a motor vehicle was first undertaken by Applicants on the basis of trying to adapt for production use, the work that two of the Applicant's in the previously mentioned concurrently pending application had undertaken in relation to testing engines already installed in motor vehicles to determine whether or not Federal Pollution Standards were met, as the after installation test was at that time considered the most practical means of testing new engines, in addition to being the only method of testing engines which had been in vehicles that were on the road for some time.

It should be understood that although the present invention is described in terms of application to the well-known present day reciprocating internal combustion engine, it can just as easily be applied to any internal combustion engine, provided that sufficient tests are made to determine permissable levels of HC and CO in different type internal combustion engines, and what engine malfunctions are indicated by different amounts of HC and CO in the exhaust.

To understand the substantial problems which had to overcome before a practial production line test could be undertaken, it is necessary to review the operation of the KEY MODE system as applied to engines already installed in vehicles.

As previously mentioned, 3 KEY MODES or given points of testing the engine have been established. In the case where the KEY MODE testing system is to be used on a motor vehicle, the three KEY MODES of testing have been established according to each of three different weight classes of vehicles to load the engines in each of those classes of vehicles to the point where engine malfunctions are most likely to occur. When used in connection with an engine installed in a motor vehicle, the KEY MODE system is used in connection with the use of a chassis dynamometer, which provides a simple way of loading the engine while mounted in a vehicle by running the vehicle at simulated road speeds. Any engine dynamometer or chassis dynamometer can be employed if the degree of power absorption (load) can be selected to match the prescribed KEY MODE power requirements at the prescribed speeds.

Some hydraulic power absorption devices inherently have suitable power speed characteristics, that is power absorption that changes approximately as the cube of the engine speed, so that if a power absorption unit applies a certain load at a given speed, the desired power absorption load will automatically occur at other speeds without requireing the load to be changed by the test operator. Dynamometers of this type are preferred for emission tests because the skill and the time required to adjust the required load at each test point is eliminated.

It has been determined that speeds and engine loads required for the KEY MODE evaluation method can be ascertained from a single power/speed curve, due to the fact that when the engine is installed in a motor vehicle of a given weight class, different loads can be imposed on the engine by running the vehicle at different speeds, depending the load desired, and that the proper load for the same engine installed in different weight class vehicle can be obtained merely by running the vehicle at a different speed. For instance, for a given engine installed in a large vehicle, the "high cruise" test would take place in the 48–50 mph speed range and the load imposed would be approximately 27 to 30 hp, while to test a compact car in the 2800 to 3750 lb range, to get the proper load (21 – 24 hp) for the "high cruise" test, the vehicle would be run at 44 – 46 mph, while with a sub-compact car, the test would be run from 36 to 38 mph. Therefore, it can be seen that only a single power absorption unit is needed to simulate the load conditions in all sizes of vehicles. The serious problem this poses in an automated production test of vehicle engines, where the production line may be set up for one size engine only, but needs the capability of being switched from testing one engine to another quickly and rapidly, will be discussed later in the specification, but as can be seen, the degree of power absorption for any speed prescribed for an engine tested after installation in a vehicle all fall on the same curve.

Power absorption devices operating in accordance with a single power speed curve arm lower in cost than those capable of variation by the test operator, and do not require any operating skill, nor any of the test operator's time in making adjustments to conduct a test at a selected load, or any equipment to change the load in lieu of the operator, thus they were ideal for optimum indoor load testing for emission evaluation of engines installed in vehicles. By operating the power absorption device with a fixed-fill, that is with the work circuit of the device completely filled with water at all times, the desired power/speed curve for the present KEY MODE method of testing is readily attained. Moreover, the power absorption device is not subject to excessive heating because there is a continuous flow of water through the unit.

Also by using a fixed-fill power absorption device, conventional power absorber components such as loading and unloading valves, torque arm etc., are eliminated, thereby reducing costs to a minimum.

In the in-vehicle test a speed meter with special prescribed markings for different speed ranges of "high cruise" and "low cruise" for the different weight classes of vehicles reduces the work of the test operator in controlling the speed of the vehicles to the prescribed speeds of KEY MODE 1 (high cruise) and KEY MODE 2 (low cruise) and observing and recording on the previously mentioned report card the values of CO and HC in the two modes of operation. For KEY MODE 3 (idle) the test operator releases the throttle and observes and records the indicated CO and HC values.

This would correspond to the reading of an RPM meter at the high cruise and low cruise speed of the engine if it was being tested outside the vehicle, as the road speed of the vehicle is directly related to the RPM of the engine.

Figure 3:
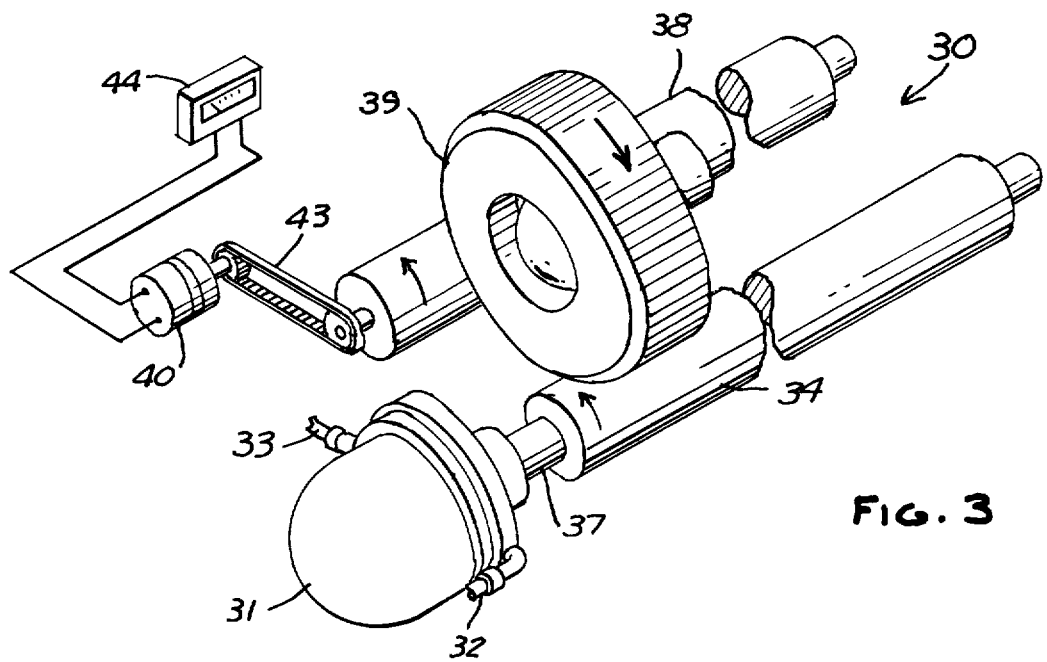
FIG. 3 is a perspective view of a simplified form of chassis dynamometer that can be used in carrying out the KEY MODE method of testing the engine after the engine has been installed in a motor vehicle.

In operation, referring to FIG. 3 of the drawings, a chassis dynamometer generally indicated by the numeral 30 comprises a hydraulic power absorption device 31 for loading the vehicle engine, an inlet connection 32 admits water into the working circuit of the power absorption device 31, and an outlet connection 33 permits the water to discharge so that a continuous flow of water through the power absorption unit occurs during the test. The customary air bleeders (not shown) are left open so that no air pockets are formed in the load circuit, thereby assuring that a constant load will be applied to the engine tested.

As shown, a drive roll 34 is directly connected with the rotor shaft 37 of the power absorption device and disposed parallel with an idler or driven roll 38. It will be understood that the wheels 39 (one shown) of the vehicle being tested are cradled between the drive roll 34 and the driven roll 38. A tachometer generator 40 is driven by a belt 43 from the driven roll 38 and is connected with a speed meter 44 to indicate to the operator the simulated road speed of the vehicle that is being developed by the drive wheels 39. The power absorption device 31 automatically loads the engine to provide the proper load corresponding to a given engine speed.

Figure 6:
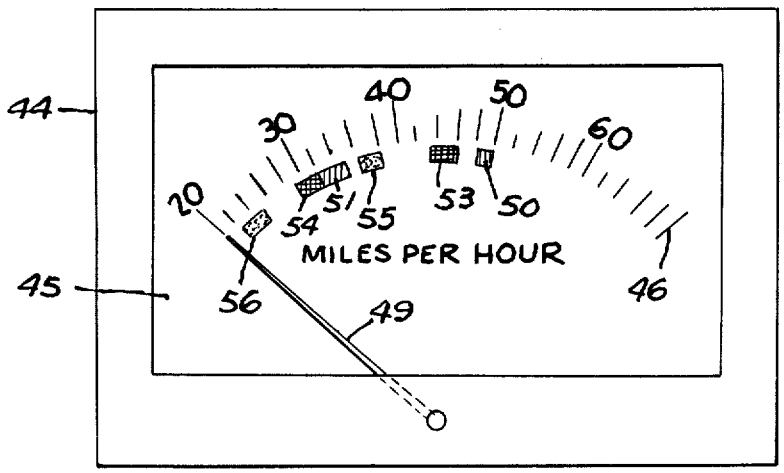
FIG. 6 is an enlarged view of the speed meter showing the speed graduations and related colored segments corresponding to the high cruise and low cruise speeds for the three weight classes of vehicles.

The speed meter 44 is shown in greater detail in FIG. 6. This meter has a dial 45 provided with calibrated graduations 46 corresponding to the road speed of the vehicle, and a pointer 49 that is actuated by the current being generated by the tachometer generator 40, and which current will vary with the speed of the driven roll 38.

The dial 45 has two segments 50 and 51 colored red and corresponding to a weight class of large vehicles weighing 3,800 lbs and up. The segment 50 spans a speed range of 48 to 50 mph and corresponds to the "high cruise" speed (KEY MODE 1) for testing vehicles in that class, while the segment 51 spans a speed range of 32 to 35 mph and corresponds to the "low cruise" range for such vehicles (KEY MODE 2).

Segments 53 and 54 on the dial 45 are colored yellow and correspond to a second class of vehicles ranging from about 2,850 to 3,750 lbs. The segment 53 spans a speed range of 44 to 46 miles per hour and corresponds to "high cruise" speed, whereas segment 54 spans a speed range of 29 - 32 mph and corresponds to the "low cruise" speed for such vehicles.

Figure 7:
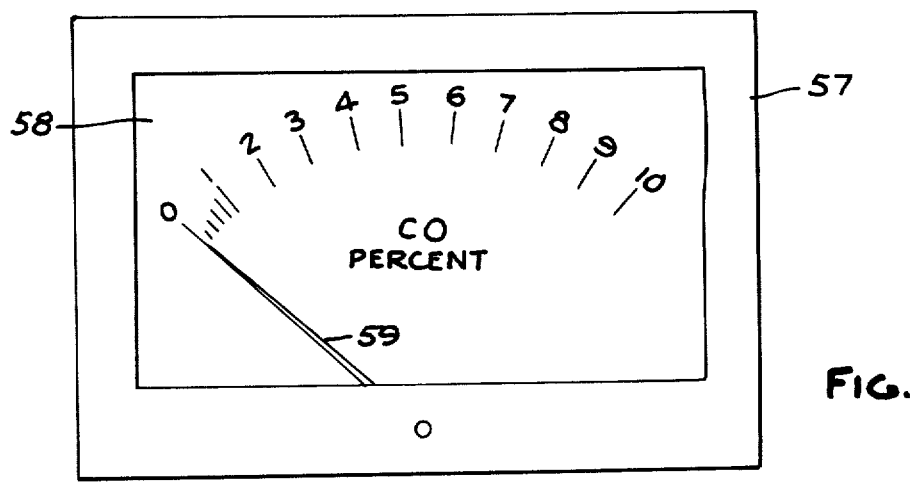
FIG. 7 is an elevational view of a typical CO meter as may be used in the system of FIG. 5.

Segments 55 and 56 on the dial 45 are a mottled black and correspond to a third weight class of vehicles ranging from about 1,800 to 2,750 lbs. The segment 55 spans a speed range of 36 to 38 mph corresponding to "high cruise", and the segment 56 spans a speed range of 22 to 25 mph corresponding to low cruise for the stated vehicle weight class. FIG. 7 illustrates the carbon monoxide (CO) meter 57 which has a dial 58 and a pointer 59. The dial is graduated from 0 to 10 and indicates the percent of CO in the exhaust gas.

Figure 8:
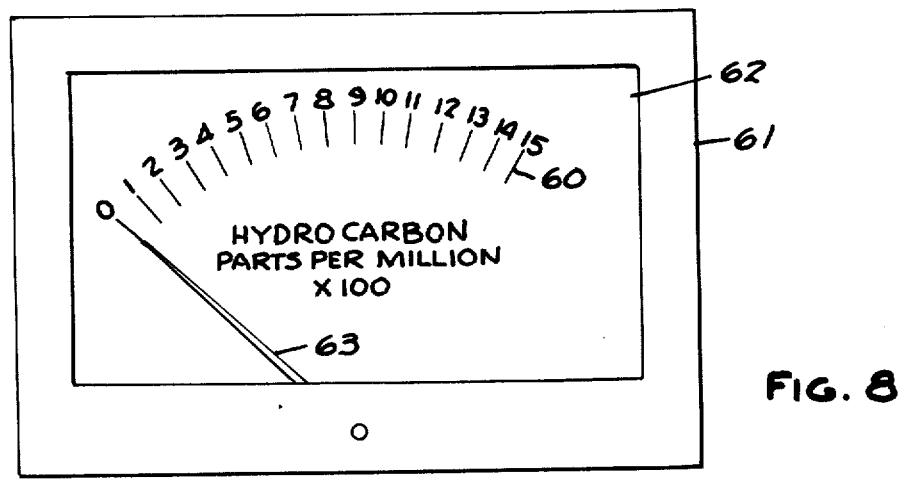
FIG. 8 is an elevational view of a typical HC meter as may be used in the system shown in FIG. 5.

FIG. 8 illustrates the hydrocarbon (HC) meter 61 which has a dial 62 and a pointer 63. The dial 62 has graduations 60 ranging from 0 to 15 for indicating the HC parts per million $\times$ 100 in the exhaust gas.

Figure 9:
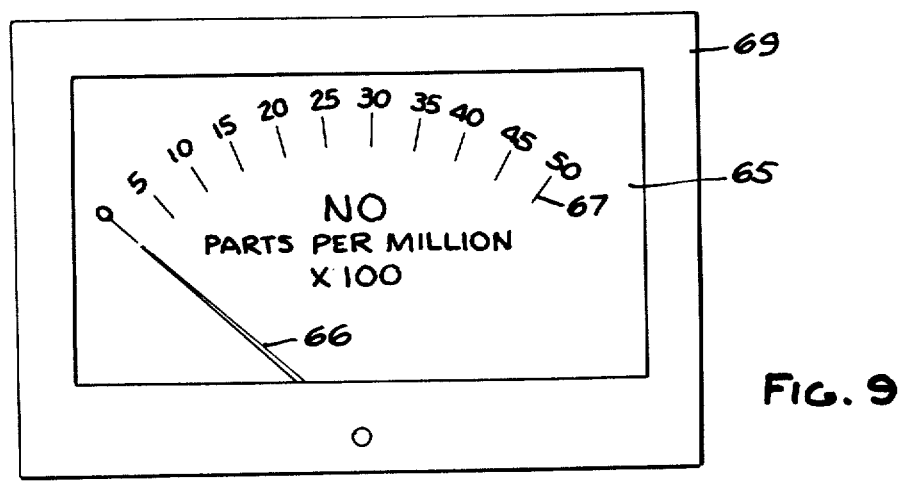
FIG. 9 is an elevational view of a typical NO meter which can be used in the system shown in FIG. 5.

FIG. 9 illustrates the nitric oxide (NO) meter 64 which has a dial 65 with graduations 67 ranging from 0 to 50, and a pointer 66. The graduations indicate the NO parts per million $\times$ 100 in the exhaust gases.

Figure 5:
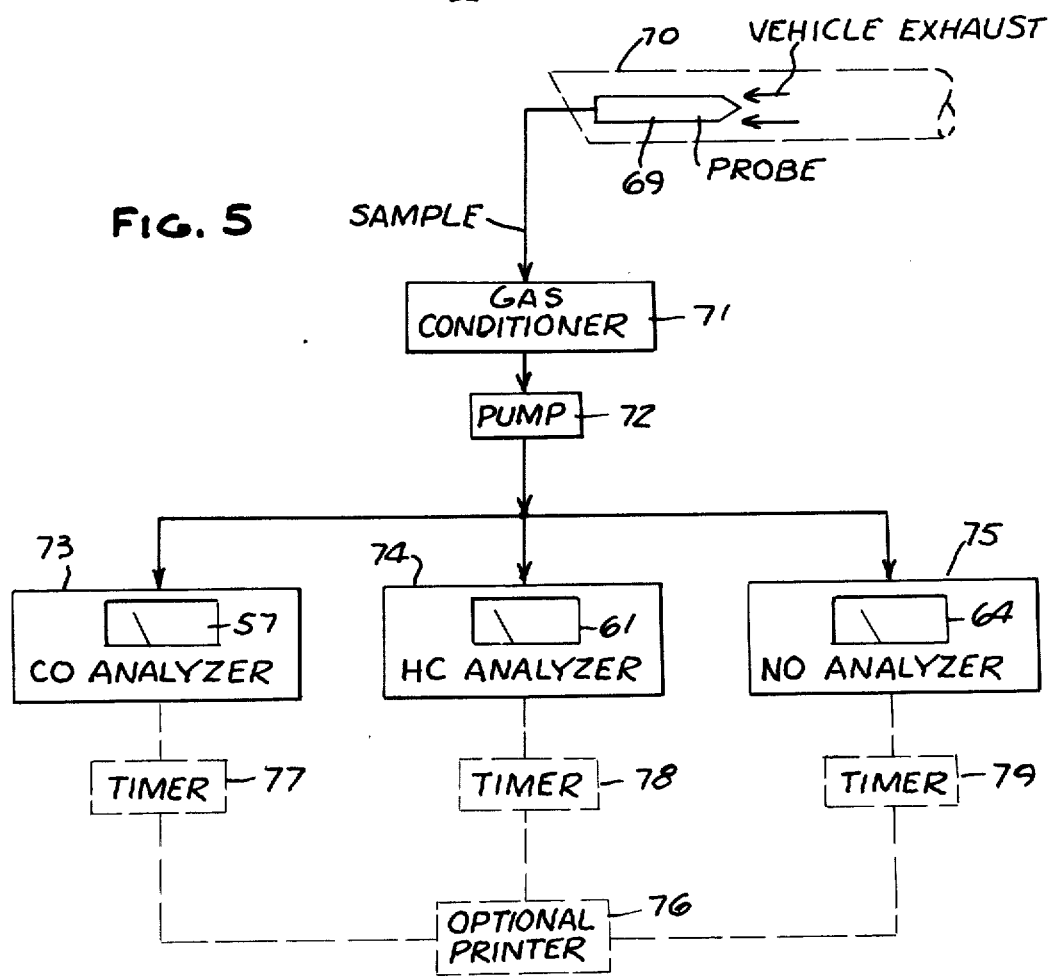
FIG. 5 is a diagrammatic view of the components of the system for evaluating exhaust gas emissions of an engine under load in a motor vehicle, including meters for indicating the value of CO, HC and NO, and an optional printout device.

The CO meter 57, the HC meter 61, and the NO meter 64, form parts of an existing gas analyzer system diagrammatically shown in FIG. 5. This apparatus includes a sampling tube or probe 69 that is normally inserted into the vehicle tail pipe 70, for continuously withdrawing a sample of exhaust gas. The gas sample is delivered to a gas conditioner 71 which conditions the gas and removes solid contaminants therefrom. A pump 72 connected with the gas conditioner continuously draws gas through the conditioner and delivers it to a CO analyzer 73, an HC analyzer 74, and optionally to a NO analyzer 75.

An electronic printout device 76 is optional and is connected with the CO, HC and NO analyzers, and is designed to automatically record the values of CO, HC and NO from the meters 57, 61 and 64 respectively after the readings have been stabilized. In order to make certain that the test operator maintains the speed of the vehicle at the prescribed speeds for a sufficient time to enable the CO, HC and NO meters to become stabilized, a conventional electric time-delay device 77 is connected between the CO meter and the printout device. Similar time delay devices 78 and 79 can be connected between the HC and NO meters and the printout device.

Figure 4:
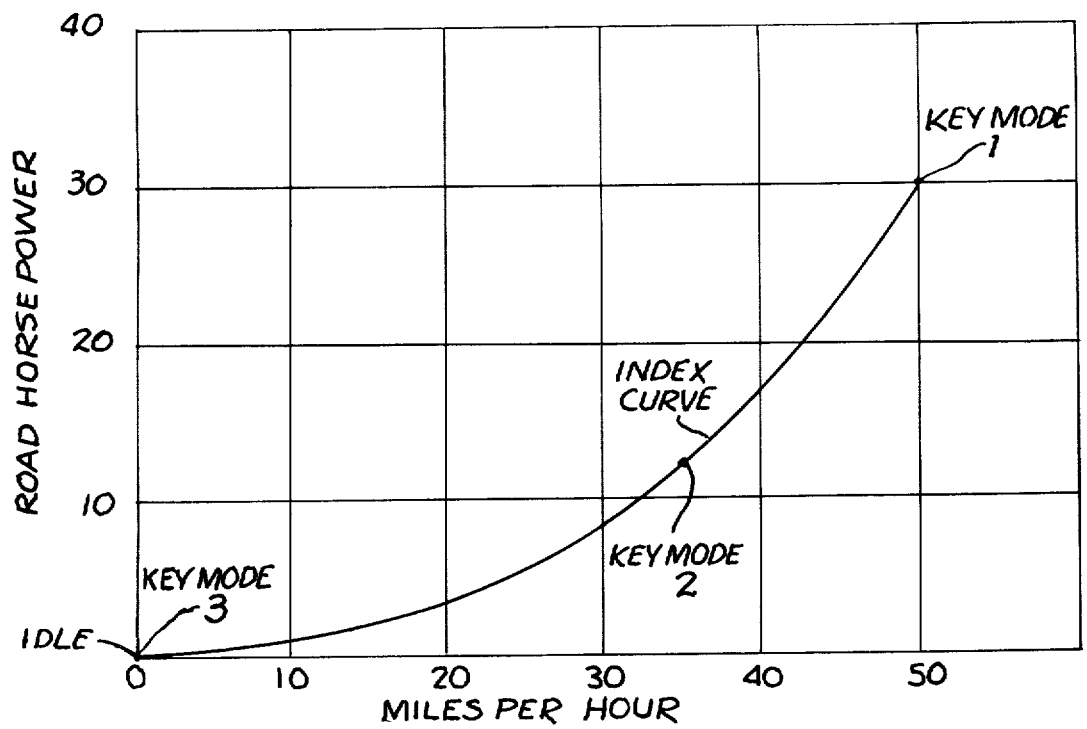
FIG. 4 illustrates a power/speed, or cube curve, of the power absorption device of FIG. 1, with the speed and horse power at the test points of KEY MODES, 1, 2 and 3, indicated thereon.

FIG. 4 illustrates a power/speed curve for the power absorption unit 31 and is ideal for use in carrying out the emission evaluation tests. As is shown, the speed in miles per hour is plotted as abscissas and horsepower as ordinates. The basic index of the curve is 30 hp at 50 mph, which is suitable for testing large vehicles in the class weighing about 3,800 lbs and up at the "high cruise" mode. For compact cars in the class weighing about 2,800 lbs to 3,750 lbs, the basic index is 24 hp at 46 mph, which is suitable for testing such vehicles at the "high cruise" mode. The basic index for sub-compact cars falling in the weight classification of about 1,800 lbs to 2,750 lbs is 15 hp at 38 mph, which is also applicable for testing at the high cruise mode. It will be recalled that the high cruise test corresponds to KEY MODE 1 of the present invention. Values of loads and speeds for testing at KEY MODE 2 (low cruise) automatically follow the same curve, as will appear more fully hereafter. The selected key points or KEY MODES for testing the engine relate to various engine operative phases. One test for example is at idle, where all the engine systems are operating at fixed conditions as specified by the vehicle manufacturer. With the engine at idle, the ignition timing, the engine speed, and the carburetor idle air-fuel ratio are all prescribed by the vehicle manufacturer, and are adjustable. The compression pressures and combustion temperatures are low at idle engine speed, and are fixed in relation to the adjustments of timing, speed, temperature and air-fuel adjustment.

Above idle speed, and with the engine developing power to move loads, all of the above conditions except dwell vary from their idle parameters. As the throttle is opened to increase engine power and/or speed output, the air flow through the engine keeps increasing substantially. Signals generated by increased air flow and/or engine speed cause automatic regulation of ignition timing and increased fuel flow. It is to be understood that during idle engine operation, fuel comes from the idle system of the carburetor, while when the engine is required to develop power, the throttle is opened and the necessary additional fuel is provided from a main jet stream of the carburetor, which is separate from the idle stream. Higher compressive pressures, engine combustion temperatures, fuel demand and electrical demand from the ignition system occur as a result of the increased throttle opening and the resultant air flow. Obviously, engines may operate successfully in one operation phase, but not in another.

As will be seen hereinafter, these same conditions apply not only to engine installed in motor vehicle, but to green engines coming off assembly lines. To be practiced, techniques for testing large numbers of engines, whether installed in vehicles, or green from the assembly line, must be short, and this precludes testing and observing engine behavior except at given points within the particular engine power and speed capacity. The selected KEY MODES Of operation used in the present invention are steady state operating conditions of constant engine speed and load. They are the selected steady state points of operation, within the power and speed range of interest, that most reliably stress the engine's systems in a manner that causes faulty components in the systems to be exposed. Other KEY MODES can be added, but are not necessary for production testing of current engines. One of these is full throttle operation, but this is not used in production hot testing of engines before installation in the motor vehicle, as it is not desired to run green engines at full power until they are somewhat broken in, due to the severe damage which might occur. Therefore, the production testing system described later does not include provisions for a full throttle test, though they could be provided if desired.

The present KEY MODE method of testing requires the use of a dynamometer or any other power absorption means for applying predetermined loads at predetermined speeds corresponding to vehicles falling in various weight classifications, the speed and load being carried out according to a fixed speed/load curve (FIG. 4) according to which the load applied varies substantially as the cube of the speed. It has been found that slight deviations in the actual values as contrasted to those shown by the curve are entirely permissable without impairment of the results.

Testing under the present method is greatly simplified by using a suitable fixed-fill power absorption unit which when completely filled with water automatically applies the desired load at the preselected vehicle speeds. This enables the method to be carried out by an unskilled test operator. The operator is only required to press on the accelerator pedal to open the carburetor throttle the proper amount to cause the engine to operate at specified simulated road speeds prescribed for the three different weight classes of vehicles, and to maintain operation of the engine at the prescribed speeds for a period of time only long enough to allow the instruments indicating the value of the CO and HC in the exhaust gases to stabilize and to record these values on a report card.

Figures 18, 19, 20:
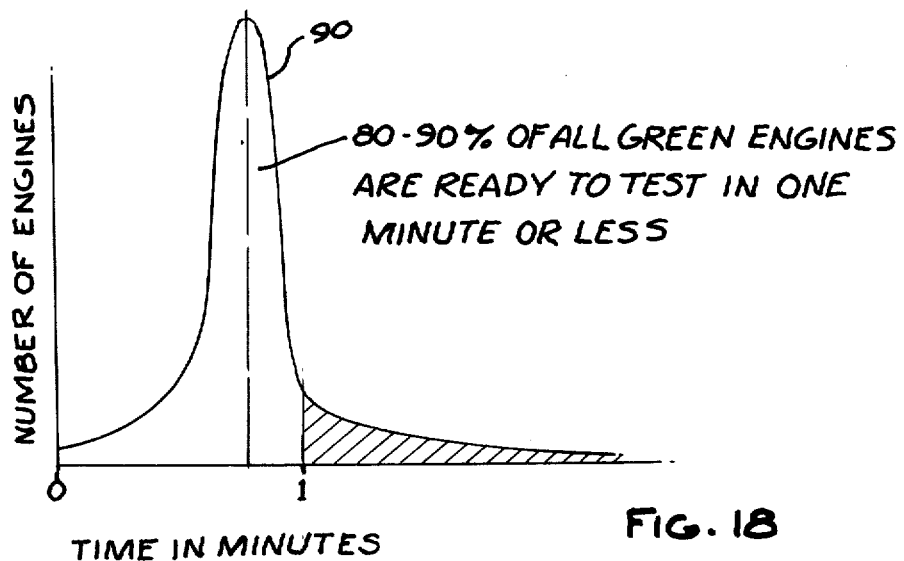
FIG. 18 is a chart showing a typical probability curve giving the time in which a green engine off the assembly line will reach a testable condition.
FIG. 19 shows a typical report card showing acceptable CO and HC values at different RPM's of the engine, and providing spaces for the operator to indicate tests for which reject lights embodied in the present invention have indicated that the engine has failed.
FIG. 20 illustrates a portion of the exemplary truth chart, more fully disclosed in the specification, having a reject pattern matching the reject marks indicated on the report card of FIG. 19.

FIG. 19 illustrates a report card 82 which may be employed either for tests of the engine after it is installed in the vehicle, or in the production testing system hereinafter described, with only minor modification. The card has a space 83 for recording needed information. In the case of testing the engine as installed in a vehicle, such information as the name of the vehicle owner and full identification data of the vehicle being tested can be inserted therein. The report card 82 has printed thereon three horizontal rows of blocks. The top row 84 has printed thereon three blocks containing the legend high cruise, low cruise and idle, corresponding to the three KEY MODES of testing. These blocks are conveniently arranged from left to right in the preferred order in which the KEY MODE tests are to be conducted.

The second row of blocks 85 comprises a first block in which the legend CO - Carbon Monoxide is printed, and additional blocks 85A, 85B, and 85C directly below the respective KEY MODE legends. The block 85A has printed therein for purposes of illustration only, a permissable maximum value of 2 percent for CO emissions at high cruise. The block 85B indicates a permissable maximum value of 2½ percent of CO emission at low cruise, and the block 82C indicates a permissable maximum value of 3 percent at idle.

The third horizontal row 86 comprises a first block in which the legend HC - Unburned Hydrocarbons is printed, and additional blocks 86A, 86B and 86C directly below the blocks 85A, 85B and 85C respectively. The block 86A has printed thereon for purposes of illustration a permissable maximum value for HC emission at high cruise, for example 220 parts per million. The block 86B indicates a permissable maximum value of 240 parts per million of HC at low cruise, and the block 86C indicates a permissable maximum value of 290 parts per million. A check mark in any block indicates rejection because of excessive emission of any contaminant involved.

During an in-vehicle engine test, the values obtained during the KEY MODE test at the loads and speeds prescribed for the vehicle involved would be placed below the indicated permissable values. The values of CO at high cruise, low cruise and idle could be 0.4 percent, 0.6 percent and 3.0 percent respectively. All of these values are within the permissable values, and they would be recorded in the proper boxes, but no check mark would be placed therein. However, the HC values for the example of FIG. 19 could be 1,252, 1,350, and 1,482 at high cruise, low cruise and idle respectively. All of those values would very greatly exceed the permissable values, and they would be recorded in the box, as well as a check mark being placed in each of the blocks, 86A, 86B and 86C.

If additional tests for NO were desired in the in-vehicle test, an additional row of blocks could be inserted under the row 86 (not shown). In addition, if a full throttle test of the vehicle would be desired, an additional column could be added at the right of the idle column in FIG. 19, and the engine run at this speed and the desired values measured.

FIG. 4 illustrates the fact that changing the speed changes the load imposed by the power absorption unit 31, thus extreme simplicity is achieved in conducting tests, since the test operator need only observe the meter indicating the simulated speed in mph that is being developed by the engine while the vehicle wheels are on dynamometer rolls 34 and 38. When the engine is operating at the desired speed the test operator holds the speed steady for a few seconds and observes the CO and HC meters 57 and 61 and records the readings thereof on a report card such as shown in FIG. 19.

The report card shown in FIG. 19 is then used in conjunction with a "truth chart", a portion of which is shown in FIG. 20. The truth chart would have diagrams such as that shown in FIG. 20 with various reject conditions indicated. The operator would then match the reject pattern of checks found in the report card of FIG. 19 with the various blocks provided on the truth chart. It will be noted that the reject pattern of FIG. 19 exactly fits into the reject pattern shown on the portion of the truth chart of FIG. 20. Under the various blocks as in FIG. 20 would appear the following information:

USUAL CAUSES

The most probable cause is ignition misfire due to a failure of an ignition system component.

SERVICE STEPS

1. Probably the most common problem is a faulty spark plug; however, this should not be a conclusion without proper examination.
2. Check out the ignition system with a scope and associated instruments. If the scope does not clearly show a faulty spark plug, observe for the following:
    a. Faulty ignition cables.
    b. Excessive point resistance or arcing.
    c. Cross fire, due to cracked or carbon-tracked cap or rotor.
    d. Moisture inside the distributor cap or on the cables.
    e. Extremely incorrect dwell angle or point gap.
    f. Low coil output voltage.
    g. Low primary voltage supplied to the coil.
    h. Loose wire connections such as distributor plate ground or coil to point wire connections.

ALWAYS MAKE THE BASIC IDLE ADJUSTMENTS OF IGNITION DWELL AND TIMING IDLE SPEED AND AIR FUEL RATIO, TO COMPLETE THE REPAIR

The report card shown in FIG. 19 indicates excessive hydrocarbons at all 3 KEY MODES of testing. A search of the truth charts until a matching reject pattern such as the block 89 shown in FIG. 20 would be made, such chart also shows excessive HC at the 3 KEY MODES of operation. Accordingly, the indicated cause of excessive HC at the 3 KEY MODES would be applicable, namely ignition mis-fire due to failure of an ignition system component. Thus the truth chart, with the report card 82, will enable the testing personnel to quickly correct the malfunction, since the chart not only indicates the nature of the malfunction, but explains the necessary steps for correcting the same.

From the foregoing discussion, it is obvious that report cards and truth charts disclosed herein are typical, and illustrate only one condition of malfunction, that is excessive HC at all test points, and that in practice the report cards will indicate engine rejection for other malfunctions and that truth charts corresponding to other malfunctions would be available to aid in correcting the malfunction.

The KEY MODE method can also be employed for engine evaluation as discussed in the previously mentioned concurrently pending application under acceleration and declaration conditions, but explanation of such use is not necessary for understanding the present invention, and therefore will not be discussed further herein. The same reasoning applies to full throttle operation, and testing for NO emissions.

It will be understood that the speeds and loads at the various KEY MODES of testing described herein can be varied slightly and still yield satisfactory results. It should also be understood that the order of testing can be varied, but that the best results can be obtained by testing according to the order of high cruise, low cruise and then idle. Modes may be added, or the number reduced, to appropriately fit the intent of the test and changes in engine and emission control systems design.

Now that an understanding of how engine emissions testing was used to test engines already installed in motor vehicles to determine if they meet emission control regulations, and to indicate defects in the engine depending on the values found in an analysis of the exhaust gases, an appreciation and understanding of the substantial problems confronting Applicants in applying such methods and apparatus to production hot testing of engines under load prior to their installation in motor vehicles can be had.

It can be seen from the foregoing discussion, that it would be most desirable to have a hot testing of the automobile engine under load prior to its installation in the automobile that would give results which are relatable to the results achieved by the foregoing method in order to make sure that engines produced in the engine plant will meet the engines design parameter when placed in the automobile, and this is certainly one of the factors which prompted Applicants to work on the present invention.

However, even more important is the great amount of information on engine malfunctions given by analysis of the data found by the KEY MODE system of exhaust gas emission testing. It is obvious that if an engine defect can be pinpointed quickly, without the need for a relatively long and expensive testing procedure, and if the engine can be repaired with definite knowledge of what is wrong, rather than on a hit and miss basis, the repair of automobile engines at the end of the assembly line can be done in a quick and inexpensive manner, saving much time and expense, and in some cases even saving the engine from the scrap pile. Therefore, work on adapting the KEY MODE system to production line became imperative.

Applicants immediately encountered several problems when trying to adapt this method to the production line that were non-existent when performing in-vehicle engine tests. The first problem that presented itself, and which required much experimentation to solve, was the problem of determining when a green engine off the assembly line is ready for testing. It has been recognized that a green engine requires some "settling down" or "break in" before it can be tested and be expected to give reliable test results. As shown by the graph in FIG. 18, and more particularly by the curve labelled 90, it has been found through experimentation that most green engines are ready to test in one minute or less, but that some can take a greater length of time before they reach a testable condition. Since it is desirable not to test engines any longer than necessary, it must be decided how long to allow for this "settling down" period for each engine design, or to gage when each engine is ready.

Since it is obvious the engine will warm up much faster under load, and since it has been found by experimentation that running the engine at high cruise or somewhat above is not harmful to a green engine, the engine is run at the recommended high cruise or above to warm up the engine faster and save valuable time.

The engine is ready for the test either when the choke is fully opened, when indicated by engine temperature, or when CO is stable.

The next problem which presented itself concerns the very nature of the production line itself, wherein an engine test line, while designed to test one type of engine as fast as possible, must also be designed to accommodate future changes in sizes and types of engines.

Therefore, it is preferable to provide a fixed-fill power absorption unit which can be easily adapted to such future changes in a simple and inexpensive manner.

The area of interest is to test the engine within the power and speed range similar to that required of it when the vehicle in which it is installed is negotiating the Official emission test. Official tests are performed on chassis dynamometers which simulate extensive on road driving, including prescribed rates of acceleration, decleeration and steady state cruising speeds. The chassis dynamometer is adjusted for each vehicle weight class to closely duplicate the effect of its weight and wind resistance on a substantially level load.

Since the steady state equivalent road speeds and rates of speed change are prescribed, the peak road speeds and road horse powers are known and equal for the various vehicle weight classes. The power/speed curve shown in FIG. 4 for quick chassis dynamometer tests was selected to load engines sufficiently at the various vehicle weight classes at high cruise load speeds to require the engine to produce powers similar to its peak when negotiating the official test. The road speeds for the large and compact vehicles are higher at high cruise than the road speeds at which peak power is usually required on the official test. This permits the quick test to be run with the transmission in its top gear, and obtain peak engine speeds similar to those reached in the lower gear usually required of the vehicle during peak acceleration rates on the Official test. The light import vehicles are run in reduced gear in the quick test. In essence, the chassis dynamometer power curve of FIG. 4, and the high cruise test speeds prescribed, exercise the engine close to the peak power and speeds it sees in propelling the driving wheels of the vehicle through its Official test. In the present invention, the engine output shaft is coupled to the power absorption unit without benefit of the vehicle transmissions to vary the speed relationship between the engine and absorber, as in the case of the complete vehicle. For example, if you were testing an engine which is of a displacement normally installed in large vehicles, and wanted to perform the high cruise test on this engine, you would have to run it at approximately 2,000 rpm, as this is about the peak speed the engine would attain during an Official vehicle emission test.

Therefore, to test the engine as above, you would need a load of 45 H.P. at 2,000 RPM. Using power absorption components manufactured in large volumes may or may not provide the desired load on the engine at the required RPM. In fact, in all probability they will not. Therefore, a way had to be found to easily modify standard power absorption units to get the desired load at the desired rpm for a wide variety of engines without the prohibitive expense of building an entirely new unit for each type and size of engine to be tested.

Figure 11:
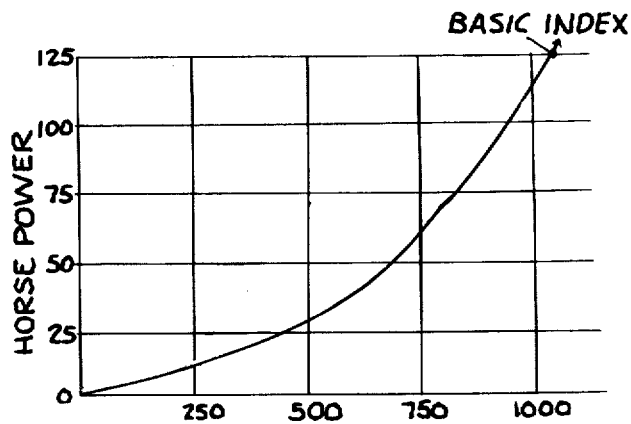
FIG. 11 is a chart showing the RPM versus the horse power load of the device shown in FIG. 10.

A typical power absorption unit generally designated by the numeral 91 (see FIG. 10) usually consists of an outer casing having a right-hand section 92 and a left-hand section 93. Mounted inside the power absorption unit is a fixed turbine wheel (stator) 94 and a rotating turbine wheel (rotor) 95 with the rotating turbine wheel 95 being fixedly mounted to and rotated by the shaft 96. The turbine wheel 95 is keyed to the shaft 96 by the key 97. The two halves of the power absorption unit 92 and 93 respectively are sealingly held together by suitable means. The unit is bolted to the test stand generally designated by the numeral 100 by the bolts 101. A water inlet 102 admits water into the interior of the power absorption unit 91 to keep it filled completely during operation. To prevent the power absorption unit from overheating during operation, a water outlet 103 is provided which will let water out of the power absorption unit, and therefore circulate it therethrough when a temperature bulb 104 reaches a predetermined temperature. (See FIG. 23), in this case 160°. To rotate the shaft 96 of the power absorption unit 91, a pulley 105 is driven by a belt 106. A curve showing the full fill loading of the popular power absorption unit illustrated in FIG. 10 in its unmodified condition is shown in FIG. 11. It will be noted that the unit is capable of 125 HP at 1050 RPM. This is excessive for performing the key mode emission test on current passenger automobile engines.

For purposes of illustration, let us now suppose that it is desired to build or change over an engine test line to test engines requiring 45 HP at 2000 RPM. Rather than custom building the relatively few power absorption units which would be needed for the engine test line, since only one power absorption unit per test stand is needed, and having to redesign and scale down every single part of a commercially available power absorption unit at prohibitive expense, Applicants have found a way to modify said commercially available power absorption units simply and inexpensively, thereby providing the advantages of simplicity of operation and maintainence not attained with a variable load absorber.

However, variable load absorbers are made in relatively large quantities because they enjoy a wide range of applications, and may be those disclosed in U.S. Pat. No. 2,768,711 or U.S. Pat. No. 2,870,875, consisting essentially of a rotating turbine wheel (rotor) and a fixed turbine wheel (stator) as shown in FIG. 10. The shape of both the rotor and stator is in the form of a torus having a minor radius $a$, and a major radius $b$, with the facing edges of the vanes of the rotor 99 and stator 98 being perpendicular to the rotor shaft 96.

Applicants have taken such standard power absorption unit and have found that by trimming back the vanes in 99 of the rotor, or the vanes 98 of the stator, at an angle beginning at the minor diameter of the respective torus and measured from a line perpendicular to the center line of the rotor or stator and passing thru its minor diameter, for example, an angle of 41½ percent, the loading characteristics of the power absorption unit are changed by virtue of the decreased fluid velocity passing between the rotating turbine wheel (rotor) 95 and the fixed turbine wheel (stator) 94. Providing different vane edge angles will provide power absorption units having differing maximum capacities.

It is then very easy to provide a power absorption unit having a loading curve matching the desired power/speed optimum for the KEY MODE emission test, that is, the H.P. is substantially proportional to the cube of the speed.

Accordingly, to provide a power absorption unit having the aforementioned flexability, Applicants choose a power absorption unit with a large enough capacity to meet any forseeable future need, the vanes 99 of the rotor 95, the vanes 98 of the stator 94, or both, are then trimmed in the way just described until the unit has a capacity to test the family of engines the particular test stand installation is concerned with, in this case 45 HP at 2000 rpm.

Figure 12:
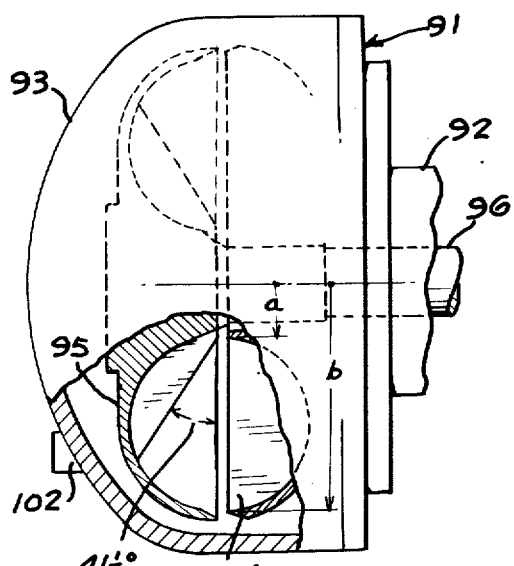
FIG. 12 is a partially cut-away elevational view showing a picture of a fixed-fill power absorption unit similar to that shown in FIG. 10, but having its moveable rotor trimmed to alter its loading curve.
Figure 13:
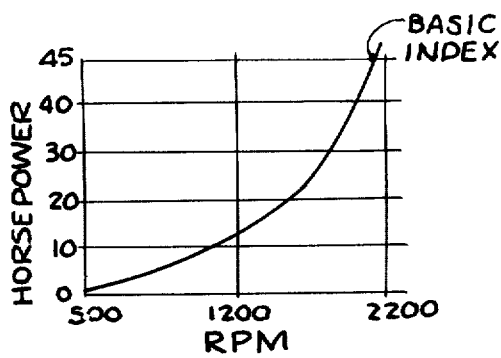
FIG. 13 shows a typical RPM vs. horsepower curve for a device which has been trimmed, such as the device shown in FIG. 12.

As shown in FIG. 13, the modified power absorption unit shown in FIG. 12 does indeed give a 45 hp load at 2,000 rpm.

In this manner, a power absorption unit can be provided for a test stand designed to test virtually any engine, and also can be easily adapted to any future test needs that arise. All the while providing a uniform loading for the engines being tested day in and day out, all without the use of any mechanical or electrical controls to make the unit follow the desired curve.

Figure 15:
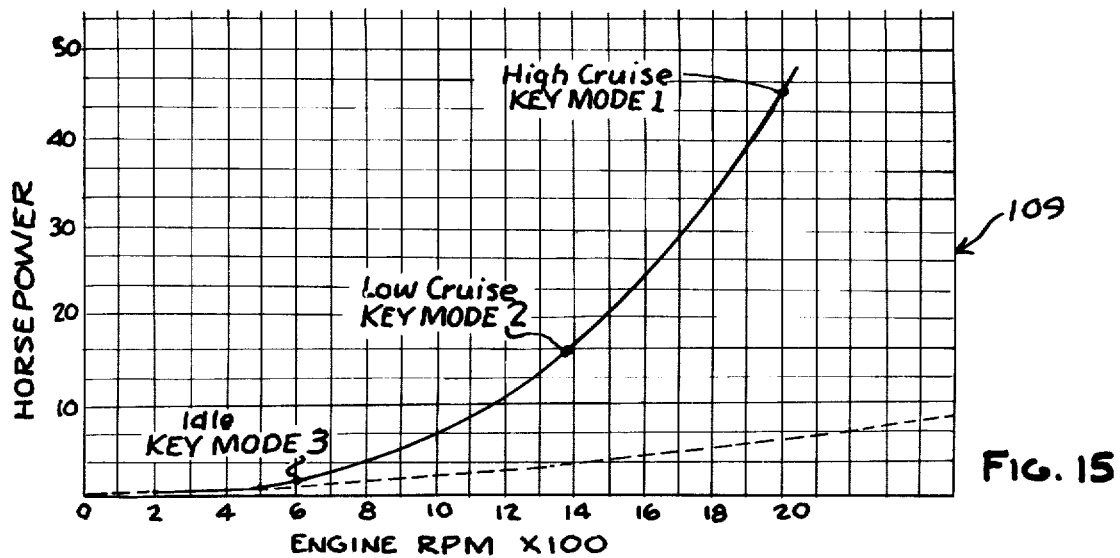
FIG. 15 shows an RPM/load curve for an engine which may be tested by the method and apparatus of the present invention, and showing thereon the 3 test points (high cruise, low cruise and idle) at which the engine is tested for HC and CO emissions.

Having surmounted the obstacle of how to easily modify a standard power absorption unit to obtain the desired loading necessary for testing the wide range of engines presently available, Applicants were then ready to apply the KEY MODE test on a production line basis. A typical KEY MODE test chart for an engine involved in a production hot test under load is shown in FIG. 15, and generally designated by the numeral 109. This chart is for engine displacement generally used in passenger cars weighing 3,800 lbs and over. In this instance it can be seen that the engine test at high cruise, which corresponds to KEY MODE 1 of FIG. 4, will be conducted at approximately 2,000 rpm, at which time a load of approximately 45 hp will be placed on the engine. The low cruise test of the engine will be performed at approximately 1,400 rpm, at which time a load of approximately 16 hp will be imposed on the engine, while the idle test will take place at the rpm specified by its manufacturer.

Figure 14:
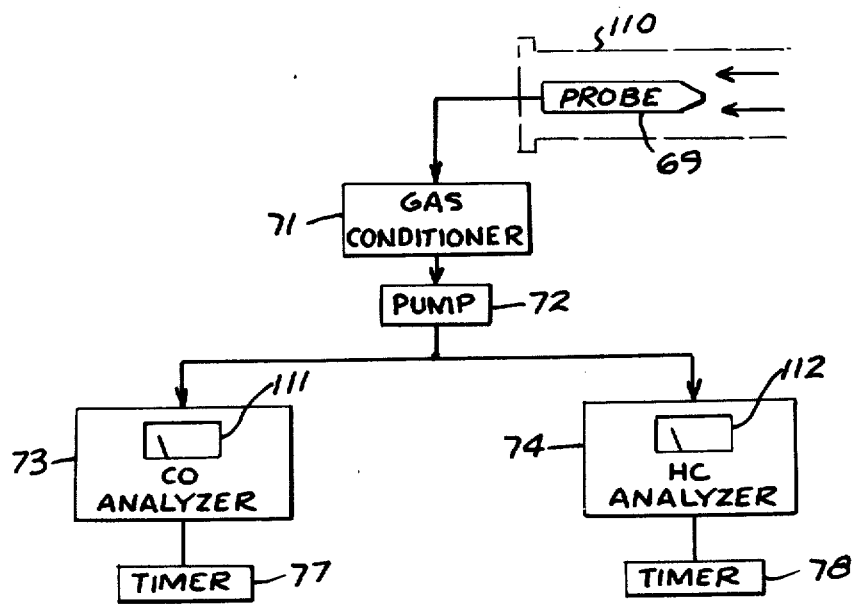
FIG. 14 is a simplified diagrammatic view of the components of an exhaust gas analyzer and measuring system as used in the present invention for evaluating the exahust emissions of green engines as they come from the production line, including meters for indicating the value of CO and HC.

Accordingly, a production hot test of the engine under load could be done manually using the simplified system shown in FIG. 14. In this case the engine would be started and run at high cruise to warm up, the probe 69 would be placed inside the exhaust manifold 110 to withdraw an exhaust sample. The pump 72 would draw gas through the gas conditioner 71 to condition the exhaust and remove solid contaminants therefrom.

On current engines it has been found that testing for NO on the production line is of little value, so that the NO analyzer 75 and the timer 79 previously used in the in-vehicle engine test are not present in the production system, but can be added when required. Instead the pump 72 delivers the exhaust gases to the CO analyzer 73 and the HC analyzer 74. The timers 77 and 78 would cause readings to be taken after the engine has "settled down." The CO and HC tests would then be repeated at low cruise and idle.

Figure 16:
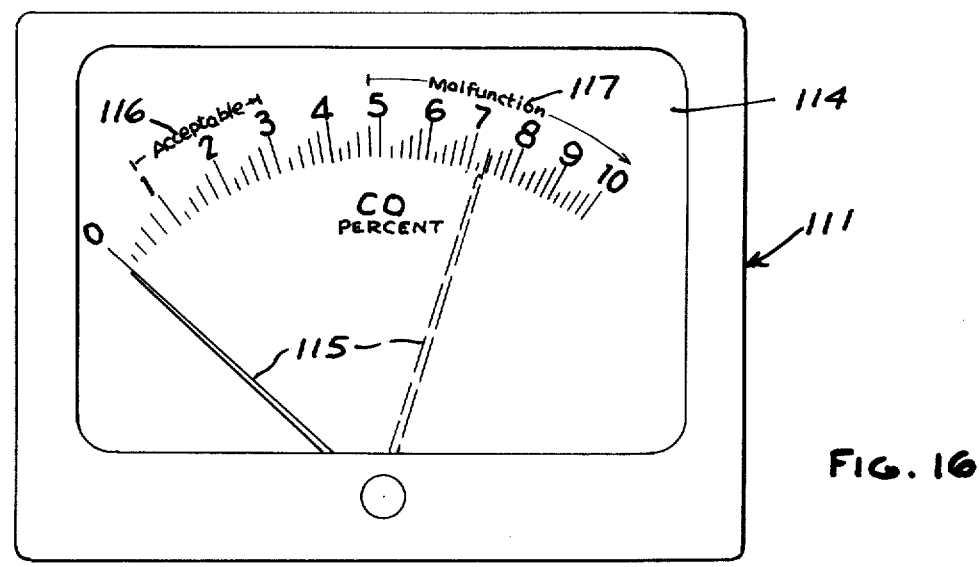
FIG. 16 is an elevational view of the CO meter used in the apparatus of the present invention.
Figure 17:
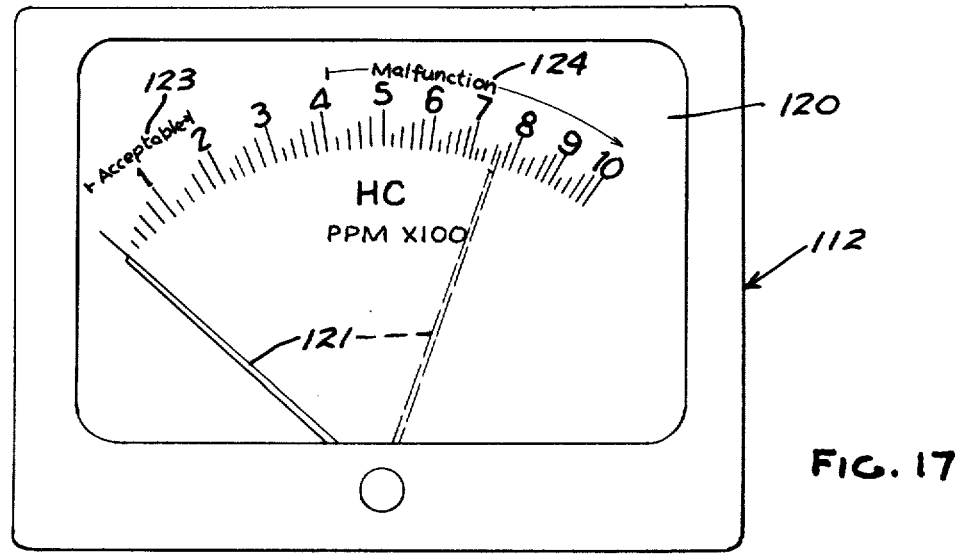
FIG. 17 is an elevational view of the HC meters as used in the present invention.

In the interests of a quick production test of the engine, instead of the sophisticated CO and HC meters 57 and 61 which were previously illustrated, the CO meter 111 as shown in FIG. 16, and the HC meter 112 shown in FIG. 17 are provided. The CO meter 111 is provided with a dial 114 and a pointer 115 in a manner similar to that as shown for the previous meters. Though the graduations on the meter are similar to those used previously, additional legend is provided on the face of the dial 114. The word "acceptable," indicated by the numeral 116, and indicating the acceptable CO range, is provided on the face of the dail 114. Similarly, the legend "malfunction" indicated by the numeral 117 is provided on the face of the dial 114. The malfunction legend 117 has means indicating an unacceptable range of CO in the exhaust gas. In contrast to the in-vehicle test of the engine, when the actual reading was taken off the dial and placed on the report card, the operator in the production test just notes whether the pointer 115 falls within the "acceptable" range or in the "malfunction" range, and such notation is indicated on the report card in FIG. 19.

When used in a production test, instead of the tests in the row of boxes labelled 84 being called high cruise, low cruise, and idle, the tests will be indicated in engine speeds, in this case 2000 RPM, 1400 RPM and 600 RPM. At each of these RPM'S the operator would note merely whether the pointer 115 indicated an acceptable range of CO, or indicated a malfunction, and would place a check in the box where the malfunction was indicated. In the example shown in FIG. 19, the report card shows that the engine passed the CO test at all ranges of RPM.

Similarly, an HC meter generally designated by the numeral 112 is provided with a dial 120 and a pointer 121. On the HC meter 112 legends indicating "Acceptable" ranges of HC and ranges of HC during which an engine "malfunction" are present are again provided. These legends are indicated by the numerals 123 and 124 respectively.

Applicants now adapt their invention to production requirements in automobile engine plant. It should be understood that the present invention is not limited to reciprocal internal combustion engines, but can be used on rotary internal combustion engines or other type internal combustion engines so long as it is found that the exhaust gas emissions from such engines are relatable to engine malfunctions. The hot testing of the engine under load may take place without any special stands or conveyors or the test may be made in one stand or in a large number of stands connected by a conveyor into one system adapted to receive the engines from loading stations and to distribute them to unoccupied stands along the conveyor for test, and after the test to receive them from the test stands and direct them to an unloading station or repair station.

Figure 1:
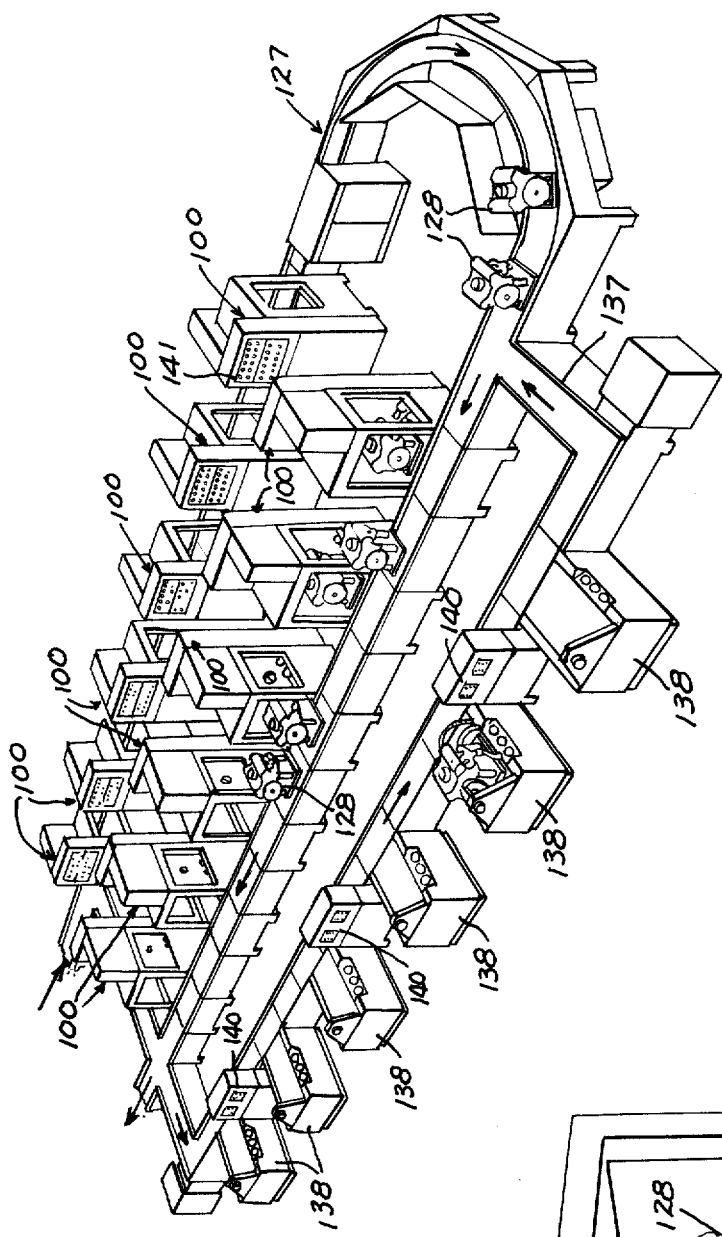

Referring specifically to FIG. 1, there is shown a test installation including a plurality of test stands 100 interconnected with the aid of a conveyor 127, which conveyor may be such as those disclosed in the Patent to V. G. Converse III, et al, U.S. Pat. No. 3,527,087 for Automated Engine Test Conveyor, or U.S. Pat. No. 3,631,967 for Accumulator Conveyor System.

The conveyor 127 is adapted to serve such stands 100 by delivering the test engines such as 128 (see FIG. 2) from the loading station on the conveyor (not shown) to the respective test stands. The test stand is adapted for hot testing the first passing untested engine, and upon completion of the hot test to return the engine to the conveyor for delivery to the unloading station or repair station. The tested engine would not be received by any other stands even if the stand is empty.

Figure 2:
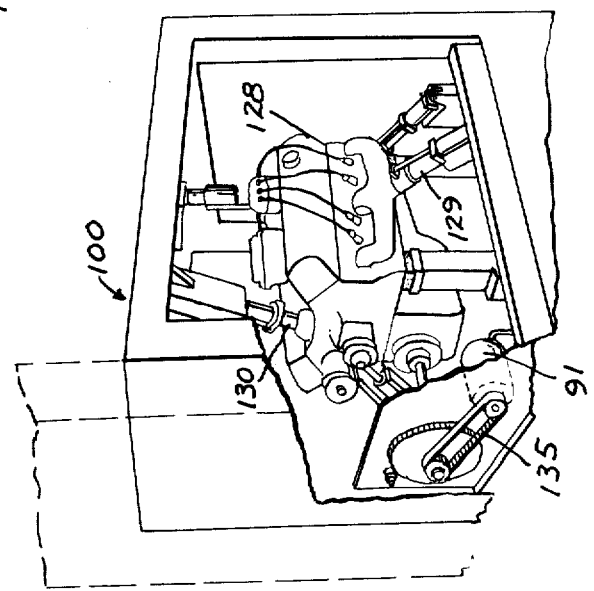
FIG. 2 is a cutaway view showing an internal combustion engine mounted in an automated test stand embodying the apparatus of the present invention, and being ready for its final box test under load before installation in a motor vehicle.
Figure 21:
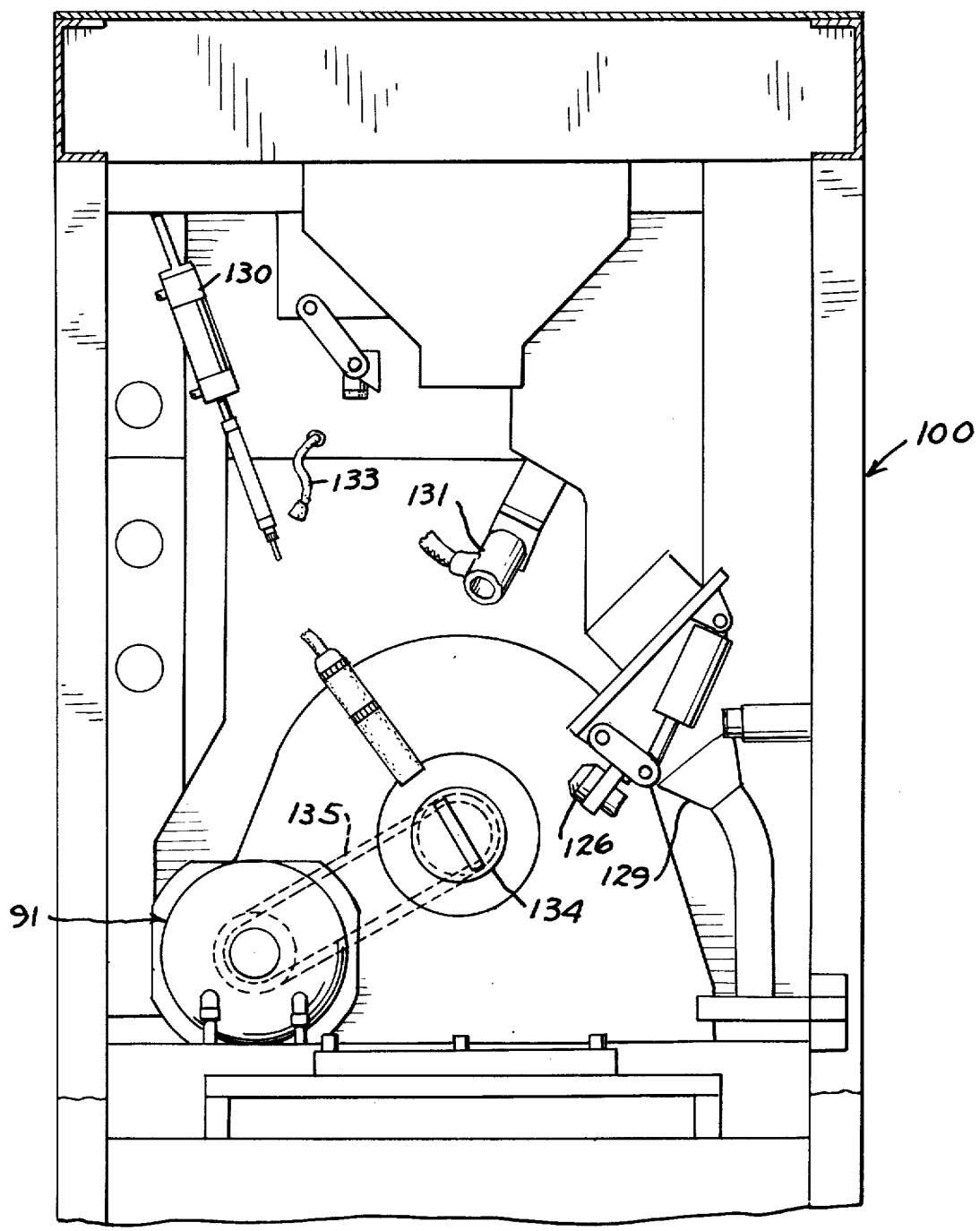
FIG. 21 is a detailed elevational view of the interior of the test stands shown in FIG. 2.

FIGS. 2 and 21 illustrate one test stand as used in the present invention. The test engine 128 received by the test stand 100 is operatively positioned therein. At such time all the connections are made which are necessary in order to be able to run the engine under its own power.

Provision is made for sampling the engine exhaust by means of the exhaust connection 129. Means to introduce water into the engine and monitor the temperature thereof are shown in the test stand and are indicated by the numerals 126 and 130 respectively, while water exits from the engine by means of the water outlet connection 131. The high voltage connection to the distributor necessary to provide ignition for the engine is shown by numeral 133, while means to start the engine, as well as drive the power absorption unit are shown at 134. The power absorption unit 91 is driven by a belt 135 from the engine's starting means 134.

It should be understood that the power absorption unit 91 can be operated in only one direction, and could be driven directly from the rear of the engine. However, it has been found that it is simpler and more economical to place the power absorption unit at the front of the engine along with all the other connections which must be made to run the engine.

A separate repair loop conveyor 137 is provided for the purposes previously described. A plurality of diagnostic and repair stations 138 are provided along the repair loop for the more detailed and time consuming testing necessary when an engine fails to pass the CO and HC emissions test. Each of the repair stands 138 has equipment to make similar connections to the engine as those which are made in the test stand in FIGS. 2 and 21, except that some such connections must be made manually. Accurate diagnostic equipment is provided for each pair of diagnostic and repair stations in the control panels 140. Instrumentation to run the automated test stands 100 is provided by the control panel 141.

The engine now being fully connected to the test stand 100 is now started automatically by the time and sequence control circuit. Once the engine is started, in order to accelerate it to the RPM necessary for the high cruise test, depending on the particular engine involved, means are provided to monitor the RPM and adjust it to the desired value.

These means are in the form of a tachometer generator 143 which gives a voltage signal proportional to RPM. For example, 5 volts equals 5,000 RPM. The voltage signal from the tachometer generator 143 (FIG. 23) is fed into a signal conditioner 144 which changes the output signal of the tachometer generator 143 to a signal which is compatible with the rest of the circuitry involved. This signal, after being conditioned, is used to drive an RPM meter 145, as well as being applied to the input of the subtractor unit 146. The other input to the subtractor unit 146 comes from a voltage supplied from the closure of RPM set point adjustment relay 149 allowing a voltage from the RPM high cruise potentiometer 207 to be applied to the subtractor 146. For purpose of convenience, the closing of the HC high limit adjust for high cruise relay 148 and the CO high limit adjust for high cruise relay 147 also take place at this time. The subtractor subtracts from the voltage signal supplied by the tachometer generator 143 the voltage from the RPM set point adjust for high cruise 149. The output of the subtractor 146 is the resulting difference and is applied to two comparators, the high RPM comparator 153, and the low RPM comparator 154. The voltage that this output signal is compared against is supplied from the in-band RPM adjust relay 155.

If the voltage output of the subtractor 146 is below the voltage supplied by the in-band RPM adjust relay 155, this means that the engine is running too slow and the low RPM comparator 154 will energize the low RPM relay 156, which causes the throttle drive controller 157 to rotate the throttle drive motor 158 in the appropriate direction to cause the speed of the engine to increase, with the RPM comparison continuously being made. When the correct speed has been reached, the low RPM relay 156 will de-energize.

At this point, the automatic time and sequence control circuit 142 will cause the engine to continue running at the high cruise RPM for approximately one minute before any tests are taken to insure that the engine is thoroughly warmed up to meet the previously described conditions.

The engine is now in a condition to be tested. The automatic time and sequence control circuit 142 will cause the exhaust gases of the engine to be sampled for approximately 15 seconds. This is accomplished by having the pump 72, which operates continuously, deliver exhaust gases to the exhaust gas analyzer 159 where a signal is generated which is related to the amounts of HC and CO in the exhaust gas. This signal is then transferred to the analyzer conversion unit 160. Therein, the signal is converted to an analog signal which is used to drive the CO and HC meters 111 and 112 respectively, as well as being transferred to the CO and HC signal conditioners 161 and 164 respectively. The outputs of the signal conditioners 161 and 164 are applied to the inputs of the CO reject comparator 162 and the HC reject comparator 163.

The other input to the CO reject comparator is the voltage supplied by the CO high limit adjust for high cruise relay 148 which has been previously closed. The closure of the CO high limit adjust for high cruise relay 148 allows a predetermined voltage from the CO high cruise potentiometer 210 to pass to the CO reject comparator 162. Similarly, the previous closing of the HC high limit adjust for high cruise relay 147 allows a predetermined voltage from the HC high cruise potentiometer 213 to be applied to the HC reject comparator 163.

If the voltage from the CO signal conditioner 161 is greater than the voltage from the CO high limit adjust relay 148, then the CO reject relay 167 will be energized. The time and sequence controller 142 will then light the appropriate reject light 165, while if the voltage were lower, meaning the CO was within limits, the CO high cruise accept light 166 would be lit.

Similarly, if the voltage from the HC signal conditioner 164 is greater than the voltage from the HC high limit adjust relay 147, then the HC reject relay 168 will be energized, causing the HC high cruise reject light 169 to be lit, while if the voltage was lower, the HC high cruise accept light 170 would be lit.

It should be understood that the 15 second duration of the gas sampling is an arbitrary time, chosen to allow a sufficient interval for the exhaust carrying lines to be purged between tests, and could be longer or shorter depending on the design of the particular apparatus used. It should be further understood that the automatic time and sequence control circuit is a common switching circuit, easily duplicated by one skilled in the art.

This completes the high cruise or KEY MODE 1 test. At this time, the time and sequence controller 142 will open the RPM set point adjust for high cruise relay 149, the CO high limit adjust for high cruise relay 148, and the HC high limit adjust for high cruise relay 147, and will simultaneously close the RPM set point adjust relay for low cruise 171, the CO high limit adjust for low cruise relay 172, and the HC high limit adjust for low cruise relay 173.

At this point, since the engine is running faster than required for the low cruise test, the voltage output from the subtractor 146, obtained in a manner similar to that previously described for the high cruise test, but utilizing a voltage from the RPM low cruise potentiometer 208, will be greater than the voltage from the RPM in-band adjust relay 155. The high RPM comparator 153 will energize the high RPM relay 174, which in turn causes the throttle drive controller 157 to rotate the throttle drive motor 158 in the appropriate direction to reduce the speed of the engine, with the RPM comparison continually being made. When the correct speed has been reached, the high RPM relay 174 will be deenergized.

At this time, the time and sequence controller 142, in a manner similar to that previously described, will sample the exhaust gases for a period of approximately 15 seconds, no one minute delay being needed, as the engine is thoroughly warmed up.

As before, gas is sampled by the probe 69, and supplied by the pump 72 to the exhaust gas analyzer 159. The signal is then transferred to the analyzer conversion unit 160 where it is converted to an analog signal, which operates the CO and HC meters 111 and 112 as previously described, as well as being transferred to the CO and HC signal conditioners, 161 and 164 respectively, which convert the CO and HC analog signals to ones compatible with the rest of the system.

Similarly to the operations which took place in the high cruise test, the CO and HC signals from the CO and HC signal conditioners are supplied to their respective comparators 162 and 163 where they are compared to a voltage signal supplied by the CO high limit adjust for low cruise relay 172 from the CO low cruise ptentiometer 211, and a voltage supplied by the HC high limit adjust for low cruise relay 173 from the HC low cruise potentiometer 214. If either or both of the voltages from the CO and HC signal conditioners are greater than the respective high limit adjust voltage, the appropriate CO or HC reject relays, 167 or 168 respectively will be energized, and will cause the time and sequence controller 142 to light the CO accept or reject light for low cruise, 177 and 179 respectively, and also to light either the HC low cruise accept or reject light, 179 and 180 respectively.

At this time the low cruise portion of the emission test is completed, and the RPM set point adjust relay for low cruise 171, the CO high limit adjust relay for low cruise 172 and the HC high limit adjust relay for low cruise 173 are opened, and the respective RPM set point adjust relay, CO high limit adjust relay and HC high limit adjust relay for idle, numbers 183, 184 and 185 respectively, are closed.

Again, the engine will be rotating too fast for the idle portion of the test, and the output voltage of the subtractor 146 will be greater than the voltage supplied by the RPM in band adjust 155 by virtue of the voltage difference between the signal supplied by the RPM signal conditioner 144, and the RPM idle potentiometer 209 thru the RPM set point adjust for idle relay 218, being greater than the voltage from the RPM in-band adjust relay 155. This will cause the high RPM comparator 153 to close the high RPM relay 174, causing the throttle drive controller 157 to rotate the throttle drive motor 158 in the appropriate direction to reduce the speed of the engine, with the RPM continuously being monitored. When the engine reaches the correct speed, the high RPM relay 174 will be deenergized, and the time and sequence controller 142 will again begin a 15 second sample of the exhaust gases.

As before, gas is sampled by the probe 69, and supplied by the pump 72 to the exhaust gas analyzer 159. The signal is then transferred to the analyzer conversion unit 160 where it is converted to an analog signal, which operates the CO and HC meters 111 and 112 as previously described, as well as being transferred to the CO and HC signal conditioners, 161 and 164, which convert the CO and HC analog signals to ones compatable with the rest of the system.

Similarly to the operations which took place in the low cruise test, the CO and HC signals from the CO and HC signal conditioners are supplied to their respective comparators 162 and 163, where they are compared with voltage signals supplied by the CO high limit adjust for idle relay 184 from the CO idle potentiometer 212, and by the HC high limit adjust for idle relay 185 from the idle potentiometer 215. If either or both of the voltages from the CO and HC signal conditioners are greater than the respective high limit adjust voltage, the appropriate CO and HC reject relays, 167 and 168 respectively will be energized, and will cause the time and sequence controller 142 to light the CO accept or reject light for idle, 186 and 187 respectively, and also to light either the HC idle accept or reject light, 188 and 189 respectively.

At this time the idle portion of the emission test is completed, and the RPM set point adjust relay for idle 183, the CO high limit adjust relay for idle 184 and the HC high limit adjust relay for idle 185 are opened, and the test is over. If the engine has passed the CO and HC tests at all the test points, this fact is shown by some appropriate means, and the engine is removed from the test stand 100 and automatically placed on the conveyor 127 for delivery to be installed in the automobile.

If the engine fails one or more tests, the operator is notified in any appropriate manner, so that he may come to the test stand and observe and record the reject pattern of the indicator lights on the report card 82, before sending the engine to the repair loop 137 for more detailed analysis.

To insure accurate test results, the emissions test system is preferably calibrated every day with the use of a gas of known CO and HC content. The first step in this calibration involves setting the CO meter 111 and HC meter 112 in the analyzer unit 160 to zero with no engine in place by means of the respective zero adjust screws 191 and 190.

Figure 22:
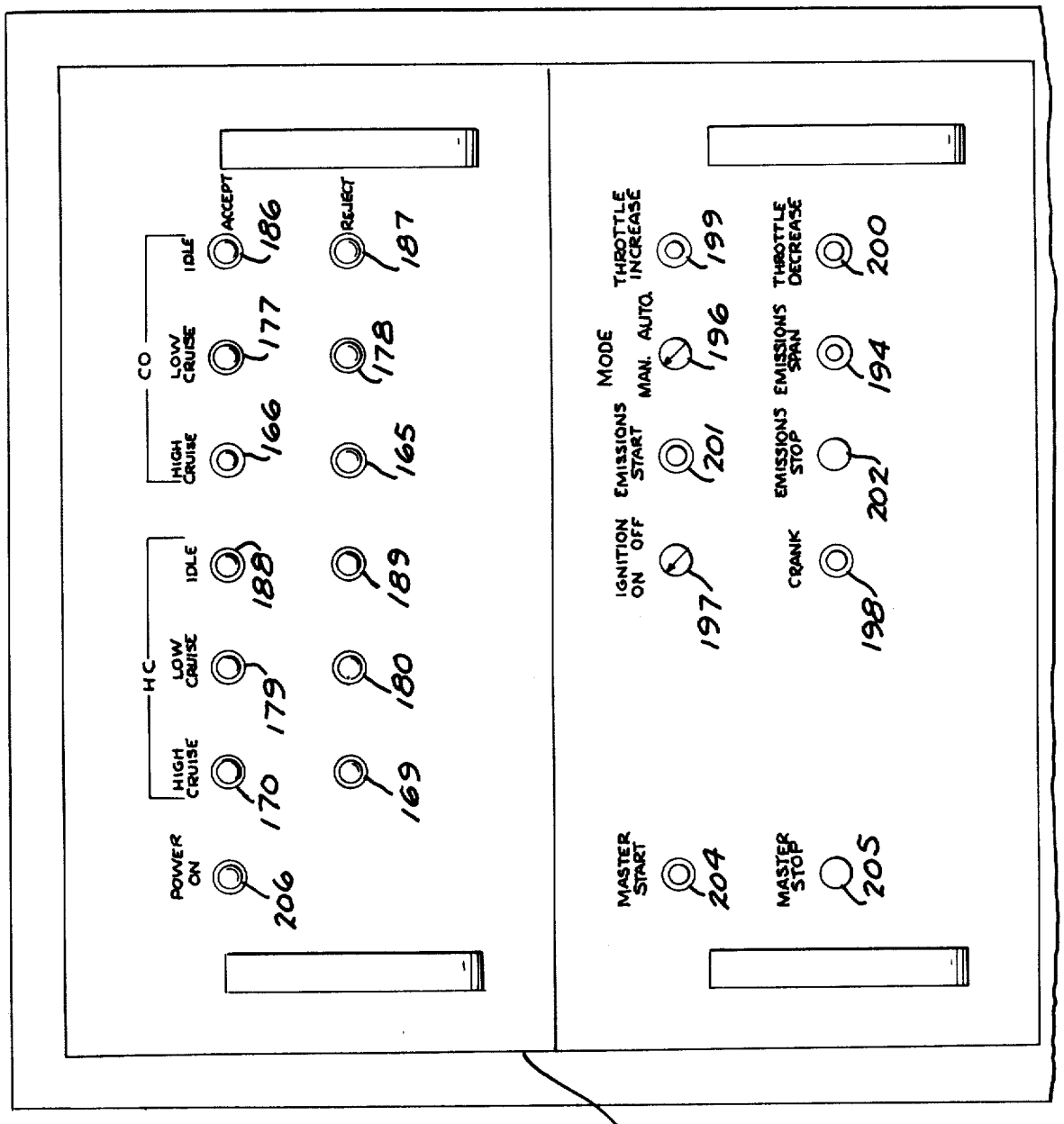
FIG. 22 is a front elevational view of the control panel for operating the system of the present invention.

The second and final step is to admit gas having a known concentration of CO and HC into the exhaust gas analyzer 159. This is done by providing the gas in a span gas tank 192, where it may be admitted to the exhaust gas analyzer by means of the valve 193. The valve may be controlled by a push button 194 such as the ones labelled "Emissions Span" on the control panel 141 (FIG. 22). After the gas is admitted to the gas analyzer 159 and a signal transferred to the conversion unit 160, the respective span adjust screws 194 and 195 are adjusted until the meters 111 and 112 show the proper reading.

If the test stand had to be operated manually for checking purposes, etc. the mode switch 196 could be placed in the manual position. In this mode of operation, the ignition could manually be turned on by the switch 197 and manually cranked by the crank button 198, with appropriate circuitry (not shown) being added to accomplish these purposes. Manual increase and decrease of engine RPM can be accomplished by the throttle increase and throttle decrease buttons, 199 and 200 respectively, which are connected as shown in FIG. 23.

If it is desired to go between manual and automatic emission sequencing while in the manual mode, pushing the emissions start button 201 will accomplish this, while a return to manual emission sequencing can be had at any time by use of the emissions stop button 202.

In either the automatic or manual mode of operation, power to the test stand is controlled by the master start and stop buttons, 204 and 205 respectively with the power on light 206 indicating whether or not such power is being supplied. A suitable power supply to operate the circuitry just described is, of course, provided.

There is thus provided an improved system for production hot testing of engines under load to reveal their defects by means of analyzing their exhaust emissions whereby the objects of the present engine listed above, and numerous additional advantages are attained.

We claim:

1. A method of production hot testing assembled internal combustion engines before installation in a motor vehicle to reveal malfunctions therein by an analysis of said engine's exhaust gas emissions, said method including the steps of providing a suitable testing apparatus in which said engines can be run, placing said engine in said testing apparatus, providing means to load the engine based on its cubic displacement which provides as closely as possible a torque load on the engine which is the same as the engine would experience if said engine were installed in a motor vehicle of a suitable weight class, connecting the engine to said loading means, starting the engine and withdrawing an exhaust sample from the exhaust system of the engine, operating the engine in more than one test mode at which malfunctions of the engine are likely to occur, with a test in the high cruise mode occurring first regardless of the number of other tests performed so that the effects of new engine tolerances and initial startup, as well as warm-up effects such as those presented by the choke will not affect said test modes, and measuring the value of CO and HC in the exhaust sample at each mode of operation, comparing the measured value of the CO and HC found in the exhaust at each mode of operation with permissable levels of CO and HC for each mode for the particular engine being tested, and indicating by any suitable means which, if any, test values exceed the prescribed permissable values.

2. The method defined in claim 1, wherein said engine malfunction would be indicated by at least one test value being excessive, thereby indicating an engine malfunction.

3. The method defined in claim 1, with the first test not necessarily occurring at the high cruise mode, but all tests occurring after said assembled engine is thoroughly warmed up to eliminate such considerations as new engine tolerances and start up effects, as well as the engine's choke, from further test consideration.

4. The method of production hot testing of assembled internal combustion engines before installation to reveal malfunctions therein by means of an analysis of said engines exhaust gas emissions, said method including the steps of providing a suitable testing apparatus in which said engines can be run, placing said engine in said testing apparatus, providing means to load the engine based on its cubic displacement which would provide as closely as possible a torque load on the engine which would be the same as the engine would experience if said engine were installed in a motor vehicle of a suitable weight class, connecting the engine to said loading means, starting the engine and withdrawing an exhaust sample, operating the engine according to a first test made at a first predetermined speed and under a first predetermined load at which an emission related malfunction of the engine is likely to occur, with said first predetermined speed and load preferably being substantially that of high cruise so that the engine may quickly warm up, thus eliminating the engine's choke as a consideration in said tests, as well as eliminating from further consideration the effects of new engine tolerances and initial start up, measuring the value of HC and CO in the exhaust sample at said first predetermined speed and load, comparing the values of CO and HC measured while operating the engine at said first predetermined speed and load with acceptable values of CO and HC for said first speed and load, and indicating by any suitable means the results of such comparison, that is whether or not the engine passed the emission test at said first speed and load, operating the engine according to a second test made at a second predetermined but different speed and under a second predetermined but different load at which an emission related malfunction of the engine is likely to occur, measuring the values of the CO and HC in the exhaust sample at said different speed and load, comparing the measured values at said different speed and load with the permissable values at such speed and load and indicating whether the engine passed or failed the CO and HC emission tests at said different speed and load, operating the engine according to a third test made at the idle speed of the engine and measuring the value of the CO and HC in the exhaust sample at said idle speed, comparing the measured values of CO and HC at idle speed with permissable values of CO and HC at idle, and indicating by any suitable means whether said engine has passed said CO and HC test at said idle speed, observing the test indicators for the results of the CO and HC tests at each of the three modes of operation and passing the engine for installation in a motor vehicle if said indicators indicate that the engine has passed the HC and CO tests at all three modes of operation, and sending the engine for repair if any of the indicators indicate the engine has failed either a CO or HC test at any mode of operation.

5. The method defined in claim 4, with said first predetermined speed and load not necessarily occurring at the high cruise mode, but with all tests being performed after said assembled engine is thoroughly warmed up to eliminate said choke and said tolerance and initial start up effects from further consideration in said tests.

6. The method as defined in claim 4, wherein the first predetermined engine speed and load are substantially higher than the second predetermined speed and load.

7. The method as defined in claim 6, wherein the first predetermined engine speed is in the range of 1,700 to 2,600 rpm with the load imposed on the engine being about 35 to 60 percent of its maximum torque capability.

8. The method as defined in claim 7, wherein the loading means load the engine so that the power absorped varies substantially as the engine RPM.

9. The method as defined in claim 6, wherein the second predetermined engine speed is about 1,250 to 1,700 rpm with the load on the engine being about 3.5 to 12 percent of its maximum torque capability.

10. The method as defined in claim 6, wherein first predetermined engine speed corresponds to the RPM of an engine mounted in a vehicle operating at the high cruise speed for a given weight vehicle, and wherein the second predetermined engine speed corresponds to the RPM of an engine mounted in a vehicle operating at the low cruise speed for a given weight vehicle.

11. A method of production hot testing of assembled engines to reveal malfunctions therein by way of an analysis of said engines exhaust gas emissions, said method including the steps of providing a suitable testing apparatus in which said engine can be run, placing said engine in said testing apparatus, providing means to load the engine based on its cubic displacement which provides as closely as possible a torque load on the engine which is the same as the engine would experience if said engine were installed in a motor vehicle of a suitable size for the particular engine being tested, connecting the engine to said loading means, starting the engine and running said engine to warm it up at the high cruise RPM until said engine's throttle plate can maintain said high cruise speed without any appreciable movement, and thereby eliminating new engine tolerance and start-up effects, as well as choke effects, from further test consideration, sampling the exhaust gas of the engine while running at the high cruise speed and simultaneously testing the HC and CO content of said sample to determine the content thereof, comparing the HC and CO content of the exhaust gas at the high cruise speed with permissable values at that speed, indicating by any suitable means the results of the HC and CO tests made at the high cruise speed, reducing the speed of said engine to an RPM corresponding to the low cruise speed of the particular engine being tested, sampling the exhaust gases of said engine while it is running at the low cruise speed, analyzing the exhaust gas to determine its HC and CO content, comparing the HC and CO content of the exhaust gas at the low cruise speed with permissable values, indicating the results of the HC and CO tests at the low cruise speed, completely releasing the engine's throttle and allowing said engine to assume its idle speed, analyzing the exhaust gas at the idle speed for its HC and CO content, comparing the CO and HC content at idle with permissable values, indicating the results of the HC and CO tests at the idle condition, observing the indications of the results of the HC and CO tests at the high cruise and low cruise and idle modes of operation and passing the engine for installation in a motor vehicle if all of said tests were passed, or sending said engine to a repair loop for more detailed tests and repair if one or more of said tests were failed.

12. The method as defined in claim 11, wherein the high cruise engine speed is about 1,700 to 2,600 RPM, with the load imposed on the engine being from 35 to 60 percent of the engines maximum torque capability.

13. The method as defined in claim 11, wherein the low cruise engine speed is about 1,250 to 1,700 RPM, with the load imposed on the engine being about 3.5 to 12 percent of its maximum torque capability.

14. The method as defined in claim 11, wherein the indication of the results of said HC and CO tests is performed by a reporting system on which the indications of whether the HC and CO tests have been passed at each mode of engine operation are indicated.

15. The method as defined in claim 14, wherein said reporting system includes a report card on which indications of whether the HC and CO tests at each mode of engine operation were passed are indicated.

16. The method as defined in claim 15, wherein said reporting system includes a truth chart having a reject pattern printed thereon matching the reject pattern of said report card, and having printed thereon the usual causes for the malfunction indicated, and the service steps that may be taken to correct the malfunction, thereby predicting engine defects on the basis of exhaust gas emissions.

17. The method defined in claim 11, wherein the providing of a suitable testing apparatus is performed by supplying a non-automated test stand in which the engine can be mounted and connections manually made for the water, oil and fuel of the engine, so that said engine can be run.

18. The method defined in claim 11, wherein said testing apparatus is an automated engine test stand wherein the engines are automatically placed in the stand, all necessary connections are made and the engines are automatically started.

19. The method defined in claim 18, where said automated test stands are provided at intervals around an automated engine test conveyor which automatically loads and unloads said automated test stands so that the engine exhaust gas emission test may be speedily carried out on a production line basis.

20. The method defined in claim 11, wherein a more detailed analysis of said engine is performed on said repair loop provided on said conveyor to which engines which have failed one or more of the exhaust emissions tests are sent.

21. The method defined in claim 20, wherein said more detailed analysis of said engine is accomplished by providing a plurality of diagnostic stands adjacent to said repair loop with said engines being automatically loaded into said stands, having detailed testing performed on said engines, based on the results of the HC and CO tests, correcting the defect if possible, and having said engines unloaded from said stands.

22. The method defined in claim 11, wherein the more detailed analysis of said engines is accomplished by providing an offline repair station having more sophisticated diagnostic equipment than said automated station at which detailed testing is performed based on the indications of the results of the HC and CO tests for the particular engine, and the defect corrected if possible.

23. The method defined in claim 11, wherein the HC and CO exhaust samples are simultaneously analyzed at each of said test points.

24. The method defined in claim 11, wherein the load imposed at the RPM corresponding to the high cruise and low cruise speeds of the engine varies approximately as the cube of the speed of said engine.

25. The method defined in claim 11, wherein at least one test value is excessive, thereby indicating an engine malfunction; and utilizing the excess test value as a guidline for repair.

26. An apparatus for production hot testing assembled engines to reveal defects therein by an analysis of said engines exhaust gas emissions, including means to provide a suitable testing apparatus in which said engines can be run, means to place said engine in said testing apparatus, means to load the engine based on its cubic displacement such that the load imposed on the engine follows as closely as possible the torque load the engine would experience if said engine were installed in a motor vehicle of a suitable weight class, for the particular engine being tested, means to connect the engine to said loading means, means to start the engine, means to withdraw an exhaust sample from the exhaust system of the engine, means to cause the engine to operate in more than one test mode at which malfunctions of the engine are likely to occur, and means to measure the value of CO and HC in the exhaust sample at each mode of operation and compare the measured value of the CO and HC found in the exhaust at each mode of operation with permissable levels of CO and HC for each mode for the particular engine being tested, and indicating means showing which if any test values exceed the prescribed permissable values.

27. The apparatus as defined in claim 26, wherein the loading means are in the form of a power absorption unit having a fixed turbine wheel and a rotating turbine wheel rotated by the engine, and being adapted to load the engine proportional to the cube of the engine RPM without any electrical or mechanical controls to control said loading means to make it produce the desired load.

28. The apparatus described in claim 26 being located in a plurality of automated engine test stands, said engine test stands being located around a completely automated engine test conveyor to form a completely automatic system for hot testing of engines under load prior to their installation in the automobile.

29. An apparatus for production hot testing of newly assembled engines to reveal malfunctions in the engine itself, or in the carburetor, ignition, and/or combustion systems thereof, said apparatus including a suitable testing apparatus in which said engines can be run, means to place said engine in said testing apparatus, loading means to load the engine based on its cubic displacement which would provide as closely as possible a torque load on the engine which would be the same as the engine would experience if said engine were installed in a motor vehicle of a suitable weight class for the engine being tested, means to connect the engine to said loading means, means to start the engine, means to operate the engine according to a first test mode at a first predetermined speed and under a first predetermined load at which a malfunction of the engine is likely to occur, means to sample said engines exhaust and to measure the value of HC and CO in the exhaust at said first predetermined speed and load, means to compare the value of the CO and HC measured while operating the engine at first said predetermined speed and load with acceptable values of CO and HC for said first speed and load, indicating means showing the results of such comparison, means to operate the engine according to a second test made at a predetermined but different speed and under a second predetermined but different load at which a malfunction of the engine is likely to occur, means to sample and measure the amount of CO and HC in the exhaust sample at said different speed and load, means to compare the measured values at said different speed and load with the permissable values at such speed and load, indicating means showing whether the engine passed or failed the CO and HC emission tests at said different speed and load, means to operate the engine according to a third test made at the idle speed of the engine, means to sample and measure the value of the CO and HC in the exhaust sample at said idle speed, means to compare the measured values of CO and HC at the idle speed with permissable values of CO and HC at idle, indicating means showing whether said engine at idle has passed said CO and HC test at said idle speed, and means to observe the test indicators for the results of the HC and CO test at each of the three modes of operation and pass the engines for installation if said indicators indicate that the engine has passed the HC and CO tests at all three modes of operation, and means to send the engines for further diagnostic tests and repair if any of the indicators show the engine has failed either a CO or HC test at any mode of operation.

30. The apparatus defined in claim 29, wherein the rotating turbine wheel of the power absorption unit is adapted to have the vanes of said turbine wheel trimmed back to vary the maximum capacity of the power absorption unit.

31. The apparatus as defined in claim 29, wherein the exhaust gas sampling means including a probe placed in the exhaust system of said engine, a pump and a gas conditioner connected to said probe to withdraw an exhaust sample, a CO analyzer and an HC analyzer to which said exhaust gas sample is delivered, an analyzer conversion unit to convert the signal from said gas analyzer to an analog signal, and a CO and HC meter driven by said analog signal to indicate the amounts of CO and HC in the exhaust gas, said meters being connected to the CO and HC analyzers respectively.

32. The apparatus defined in claim 31, wherein a timer is connected to both the CO and HC analyzer to cause a reading to be shown on the CO and HC meters only after the exhaust sampling system has reached a stabilized condition.

33. The apparatus defined in claim 31, wherein the indicating means are in the form of legend provided on the dial of the CO and HC meters.

34. The apparatus defined in claim 31, wherein said CO comparison means include a CO signal conditioner connected to said analyzer unit to receive said CO analog signal and condition the same to make it compatible with the rest of the system, a CO comparator connected to said signal conditioner, a CO high cruise potentiometer, a CO high limit adjust for high cruise relay connecting said potentiometer to said comparator, a CO low cruise adjust potentiometer, a CO high limit adjust for low cruise relay connecting said low cruise potentiometer to said comparator, a CO idle adjust potentiometer, a CO high limit adjust for idle relay connecting said idle potentiometer to said comparator, and a CO reject relay connected to said CO comparator which is energized when the voltage from said signal conditioner exceeds the voltage from the appropriate high limit adjust relay, depending upon which mode the engine is being tested in.

35. The apparatus defined in claim 34, wherein the CO accept or reject indicating means include CO accept lights for each mode of engine testing desired to indicate if the engine has passed the CO test, CO reject lights for each mode of testing desired to indicate if the engine has failed a particular CO test, a time and sequence control circuit connected to said accept and reject lights to activate them, the time and sequence controller being connected to the CO comparator.

36. The apparatus defined in claim 34, wherein the HC accept or reject indicating means include HC accept lights for each mode of engine testing desired to indicate if the engine has passed the HC test, HC reject lights for each mode of testing desired to indicate if the engine has failed a particular HC test, a time and sequence control circuit connected to said accept and reject lights to activate them, the time and sequence controller circuit being connected to the HC comparator.

37. The apparatus defined in claim 31, wherein said HC comparison means include an HC signal conditioner connected to said analyzer unit to receive said HC analog signal and condition the same to make it compatible with the rest of the system, an HC comparator connected to said signal conditioner, an HC high cruise potentiometer, a HC high limit adjust for high cruise relay connecting said potentiometer to said comparator, an HC low cruise adjust potentiometer, a HC high limit adjust for low cruise relay connecting said low cruise potentiometer to said comparator, an HC idle adjust potentiometer, a HC high limit adjust for idle relay connecting said idle potentiometer to said comparator, and an HC reject relay connected to said HC comparator which is energized when the voltage from said signal conditioner exceeds the voltage from the appropriate high limit adjust relays depending upon which mode the engine is being tested in.

38. The apparatus defined in claim 29, wherein the means to run the engine at the proper rpm to perform said first, second and third test include a tachometer generator, a signal conditioner connected to said tachometer generator, an RPM meter connected to said signal conditioner, a subtractor unit also connected to said signal conditioner, an RPM high cruise potentiometer, an RPM set point adjust for high cruise relay connecting said high cruise potentiometer to said subtractor unit, an RPM low cruise potentiometer, an rpm set point adjust for low cruise relay connecting said low cruise potentiometer to said subtractor unit, an RPM idle potentiometer, an RPM set point adjust for idle relay connecting said idle potentiometer to said subtractor, a high RPM comparator connected to said subtractor unit, a low rpm comparator connected to said subtractor unit, both of said comparators being driven by said subtractor unit, an in-band adjust potentiometer connected to both said high RPM and said low RPM comparators to supply a reference signal thereto, a high RPM relay connected to said high RPM comparator, a low RPM relay connected to said low rpm comparator, a throttle drive controller connected to both the high RPM relay and the low rpm relay to activate a throttle drive motor in the appropriate direction to decrease engine RPM if said high RPM relay is in its energized condition, and a throttle drive motor connected to said throttle drive controller to operate the engine throttle to increase or decrease the RPM of said engine.

39. In an engine testing system adapted to indicate engine malfunctions and their possible causes, a method of providing a loading device for the engine being tested which provides a known load on said engine substantially proportional to the cube of the engine's RPM at which it is desired to test, but is easily modifiable to provide any future substantially cubic loading characteristic at similar engine RPM which is needed, said method including the steps of providing said engine testing system with a power absorption unit having rotor and stator elements and having a capacity sufficient to meet any foreseeable engine testing need, and altering the loading characteristics of said power absorption unit by modifying the leading edge of the vanes of one of the rotor or stator elements beginning at substantially the minor diameter of said element and extending to the torus at a point beyond the minor diameter to define a new leading edge for the resultant vanes, the new leading edge being positioned inwardly from a line drawn between the minor and the major diameters, to alter said power absorption unit capacity to one suitable for testing a current size engine, thereby allowing said system to be easily altered to test different engine sizes without having to replace the entire power absorption unit each time a different size engine is to be tested, all of the above being accomplished without external regulation of the power absorption unit.

40. The method as defined in claim 39, except that to alter the loading characteristics of said power absorption unit, the vanes of only the rotor thereof are trimmed back to increase the clearance distance between the leading edges at the stator and rotor vanes, and the stator thereof is left untouched.

41. The method as described in claim 39, except to alter the loading characteristics of said power absorption unit, only the vanes of the stator thereof are trimmed back to increase the clearance distance between the leading edges of the rotor and stator vanes, and the rotor is left untouched.

42. In an engine testing system adapted to indicate engine malfunctions and their possible causes, a method of providing a loading device for the engine being tested which provides a known load on said engine substantially proportional to the cube of the engine's RPM at which it is desired to test, but is easily modifiable to provide any future substantially cubic loading characteristic at similar RPM which is needed, said method including the steps of providing said engine testing system with a power absorption unit having rotor and stator elements and having a capacity sufficient to meet any foreseeable engine testing need, and altering the loading characteristics of said power absorption unit by modifying the leading edge of the vanes of the stator elements beginning at substantially the minor diameter of said element and extending to the torus at a point beyond the diameter to alter said power absorption unit capacity to one suitable for testing a current size engine, thereby allowing said system to be easily altered to test different engine sizes without having to replace the entire power absorption unit each time a different size engine is to be tested, all of the above being accomplished without external regulation of the power absorption unit.

* * * * *